US012718996B2

(12) United States Patent
Yang

(10) Patent No.: US 12,718,996 B2

(45) Date of Patent: Aug. 25, 2026

(54) ARC EXTINGUISHING UNIT AND AIR CIRCUIT BREAKER COMPRISING SAME

(71) Applicant: LS ELECTRIC CO., LTD., Anyang-si (KR)

(72) Inventor: Seung Pil Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 286 days.

(21) Appl. No.: 18/288,330

(22) PCT Filed: Apr. 22, 2022

(86) PCT No.: PCT/KR2022/005787

§ 371 (c)(1),
(2) Date: Oct. 25, 2023

(87) PCT Pub. No.: WO2022/231219

PCT Pub. Date: Nov. 3, 2022

(65) Prior Publication Data

US 2024/0222050 A1 Jul. 4, 2024

(30) Foreign Application Priority Data

Apr. 27, 2021 (KR) ........................ 10-2021-0054463

(51) Int. Cl.

*H01H 33/10* (2006.01)
*H01H 73/04* (2006.01)
*H01H 73/18* (2006.01)

(52) U.S. Cl.

CPC ............ *H01H 33/10* (2013.01); *H01H 73/04* (2013.01); *H01H 73/18* (2013.01)

(58) Field of Classification Search

CPC ........ H01H 9/302; H01H 9/342; H01H 9/362; H01H 9/30; H01H 9/345; H01H 2009/348;

(Continued)

(56) References Cited

U.S. PATENT DOCUMENTS 4,612,426 A 9/1986 Maier et al.
4,733,032 A 3/1988 Pardini (Continued)

FOREIGN PATENT DOCUMENTS

CN 203839321 * 9/2014 ............ H01H 73/18
EP 2421015 A1 2/2012

(Continued)

OTHER PUBLICATIONS

Translation of KR20180124825 (Original document published Nov. 21, 2018) (Year: 2018).*

(Continued)

*Primary Examiner* — William A Bolton

(74) *Attorney, Agent, or Firm* — K&L Gates LLP

(57) ABSTRACT

Disclosed are an arc extinguishing unit and an air circuit breaker comprising the same. An arc extinguishing unit according to an embodiment of the present disclosure includes a gassing material that generates molecules that extinguish an arc when heat generated by the arc is applied. Accordingly, the arc can be extinguished quickly. In addition, the arc extinguishing unit includes an outer support plate made of glass fiber and has a mechanically and thermally strong side plate part, so that burnout due to arc heat can be prevented.

11 Claims, 14 Drawing Sheets

(58) Field of Classification Search
CPC .. H01H 2009/365; H01H 33/04; H01H 33/10; H01H 31/02; H01H 73/04; H01H 73/18
USPC ........ 218/1, 15, 34, 38, 46, 76, 81, 90, 103, 218/106; 200/10, 400
See application file for complete search history.

(56) References Cited

U.S. PATENT DOCUMENTS

| | | | | |
|---|---|---|---|---|
| 5,898,152 | A | 4/1999 | Kim | |
| 7,034,242 | B1 * | 4/2006 | Shea | H01H 73/18 218/156 |
| 7,488,915 | B2 * | 2/2009 | Pollitt | H01H 9/342 335/201 |
| 7,705,263 | B2 * | 4/2010 | Rane | H01H 9/34 218/15 |
| 8,222,555 | B2 * | 7/2012 | Schaltenbrand | H01H 9/362 218/157 |
| 8,772,665 | B2 * | 7/2014 | An | H01H 9/346 218/16 |
| 9,064,648 | B2 * | 6/2015 | Rival | H01H 9/342 |
| 10,665,403 | B2 * | 5/2020 | Rival | H01H 33/74 |
| 2008/0067153 | A1 | 3/2008 | Pollitt et al. | |
| 2013/0284702 | A1 * | 10/2013 | Hamada | H01H 9/346 218/26 |

FOREIGN PATENT DOCUMENTS

| | | | |
|---|---|---|---|
| JP | H03102733 | A | 4/1991 |
| KR | 2019970006890 | Y1 | 7/1997 |
| KR | 2019990001783 | U | 2/1999 |
| KR | 200393296 | Y1 | 8/2005 |
| KR | 20180124825 | A | 11/2018 |

OTHER PUBLICATIONS

Transdlation of CN203839321 (Original document published Sep. 17, 2014) (Year: 2014).*
Extended European Search Report for related European Application No. 22796052.3; action dated May 14, 2025; (12 pages).
International Search Report for related International Application No. PCT/KR2022/005787; action dated Nov. 3, 2022; (2 pages).
Written Opinion for related International Application No. PCT/KR2022/005787; action dated Nov. 3, 2022; (4 pages).

* cited by examiner (a)

(b)

ARC EXTINGUISHING UNIT AND AIR CIRCUIT BREAKER COMPRISING SAME

CROSS-REFERENCE TO RELATED APPLICATION

This application is a National Stage of International Application No. PCT/KR2022/005787, filed on Apr. 22, 2022, which claims priority to and the benefit of Korean Patent Application No. 10-2021-0054463, filed on Apr. 27, 2021, the disclosures of which is incorporated herein by reference in its entirety.

TECHNICAL FIELD

The present disclosure relates to an arc extinguishing unit and an air circuit breaker including the same, and more particularly, to an arc extinguishing unit capable of effectively extinguishing an arc generated by breaking an electric current and an air circuit breaker including the same.

BACKGROUND

A circuit breaker refers to a device capable of allowing or blocking energization with the outside by contacting and separating fixed contacts and movable contacts. A fixed contact and a movable contact provided in the circuit breaker are respectively connected energizably to an external power source or load.

The movable contact is movably provided in the circuit breaker. The movable contact can be moved towards or away from the fixed contact. When the movable contact and the fixed contact come into contact to each other, the circuit breaker may be energizably connected to an external power source or load.

When an overcurrent or abnormal current flows in the circuit breaker, the movable contact and the fixed contact in contact are spaced apart from each other. In this case, the current energized between the movable contact and the fixed contact does not immediately disappear, but changes into an arc form and extends along the movable contact.

An arc can be defined as a flow of electrons at high temperature and high pressure. Therefore, when the generated arc stays in the inner space of the circuit breaker for a long time, there is a concern that each component of the circuit breaker may be damaged. In addition, when the arc is discharged to the outside of the circuit breaker without a separate treatment process, there is a risk of injury to the user.

Accordingly, circuit breakers are generally provided with an extinguishing device for extinguishing and discharging an arc. The generated arc passes through the extinguishing device, the arc pressure is increased, the moving speed is increased, and it is cooled at the same time and can be discharged to the outside.

Meanwhile, since the arc generated inside the arc extinguishing unit has an instantaneous temperature of thousands of degrees, internal components are often deteriorated or damaged by heat.

Therefore, there is a growing need for a structure for preventing burnout caused by heat generated in the process of extinguishing an arc generated inside the arc extinguishing unit through assembly or structural change in the arc extinguishing unit.

SUMMARY

The present disclosure is directed to providing an arc extinguishing unit having a structure capable of solving the above problems and an air circuit breaker including the same.

First, the present disclosure is directed to providing an arc extinguishing unit having a structure capable of quickly extinguishing and moving a generated arc and an air circuit breaker including the same.

In addition, the present disclosure is directed to providing an arc extinguishing unit and an air circuit breaker capable of preventing burnout of internal components of the arc extinguishing unit due to an arc in a path along which an arc moves.

In addition, the present disclosure is directed to providing an arc extinguishing unit and an air circuit breaker in which the generated arc can be quickly extinguished within the arc extinguishing unit.

In order to achieve the above objects, the present disclosure provides an arc extinguishing unit, including: a plurality of side plate parts spaced apart from each other and disposed to face each other; a plurality of grids located between the side plate parts, spaced apart from each other, and coupled to the side plates, respectively; and a cover assembly disposed above the grid and configured to cover the grid, wherein the side plate part includes a gassing material that generates molecules that extinguish an arc when heat generated by the arc is applied.

In addition, the side plate part may further include an outer support plate disposed outside the gassing material, coupled to the grid, and pressurizing and fixing the gassing material toward the grid.

In addition, the outer support plate may include a fiber-reinforced polyester composite.

In addition, the grid may include a protrusion part protruding from a side surface so as to be coupled to the side plate part, and the protrusion part may include a body part extending from a side surface of the grid, and a first protrusion and a second protrusion extending from the body part to both sides.

In addition, the first protrusion and the second protrusion may be spaced apart from each other and extend outwardly from the body part and extend in a direction away from each other so as to be symmetrical about the central portion of the body part.

In addition, a U-groove capable of absorbing the left and right deformation of the first protrusion and the second protrusion by an external force may be formed in a space between the first protrusion and the second protrusion, and a concave groove capable of absorbing back and forth deformation of the first protrusion and the second protrusion by an external force may be formed between the first protrusion and the second protrusion and the body part.

In addition, a through hole into which the protrusion part is inserted may be formed in the outer support plate, and the outer support plate may include a central member formed in the through hole and extending across the through hole so that the first protrusion and the second protrusion are inserted separately from each other.

In addition, the cover assembly may include an upper frame disposed at the top and through which a lattice exhaust outlet is formed in the central portion; a mesh part disposed below the upper frame and composed of a plurality of layers, each layer having different wire diameters; a first insulation filter disposed below the mesh part and having an exhaust hole formed in a partial area thereof; a second insulation filter disposed below the first insulation filter and having an exhaust hole formed in an area different from the exhaust hole of the first insulation filter; and a spacer interposed between the first insulation filter and the second insulation filter to maintain a distance between the first insulation filter and the second insulation filter.

In addition, the cover assembly may further include a cover body accommodating and fixing the mesh part, the first insulation filter, the spacer, and the second insulation filter; and a packing part coupled to the cover body, blocking a space between the outside and the cover assembly, and maintaining internal pressure; and the cover assembly may have coupling protrusions protruding from sidewalls of the inner space and formed to be fitted to sidewalls of the first insulation filter, the spacer, and the second insulation filter.

In addition, a plurality of exhaust holes, aligned in the width direction and the longitudinal direction, may be formed in the first insulation filter, and the first insulation filter may be composed of a first region in which the exhaust hole is formed in the entire area along the width direction; a second region in which the exhaust hole is formed in a partial area in the width direction; and a third region in which the exhaust hole is not formed.

In addition, the plurality of exhaust holes formed in the second region Z-B may be: formed at the center in the width direction in an area adjacent to the third region; formed throughout the width direction in an area adjacent to the first region, and formed such that the number of exhaust holes formed gradually increases from the third region to the first region.

In addition, the present disclosure provides an air circuit breaker, including a fixed contact; a movable contact configured to be movable in a direction toward or away from the fixed contact; and an arc extinguishing unit disposed adjacent to the fixed contact and the movable contact, and configured to extinguish an arc generated when the fixed contact and the movable contact are spaced apart, wherein the arc extinguishing unit may include a plurality of side plate parts spaced apart from each other and disposed to face each other; a plurality of grids located between the side plate parts, spaced apart from each other, and coupled to the side plates, respectively; and a cover assembly disposed above the grid and configured to cover the grid, and the side plate part may include a gassing material that generates molecules that extinguish an arc when heat generated by the arc is applied.

In addition, the air circuit breaker may further include a low runner disposed on a fixed contact terminal to which the fixed contact is connected and extending upward of the fixed contact.

According to embodiments of the present disclosure, the following effects can be achieved.

First, a gassing material is provided in the arc extinguishing unit. The gassing material generates molecules capable of extinguishing the arc as the arc is applied. Accordingly, the generated arc can be quickly extinguished.

In addition, in the arc extinguishing unit, an outer support plate made of a fiber-reinforced polyester composite supports the above-described gassing material. Accordingly, it is possible to support the gassing material, which is degraded by the arc and whose physical rigidity is weakened.

In addition, since the grid of the arc extinguishing unit has protrusion parts split on both sides, separation from the side plate part due to external force can be reduced.

In addition, the arc extinguishing unit includes a first insulation filter and a second insulation filter having different exhaust holes, so that pressure inside the arc extinguishing unit can be adjusted.

DETAILED DESCRIPTION

Figure 1:
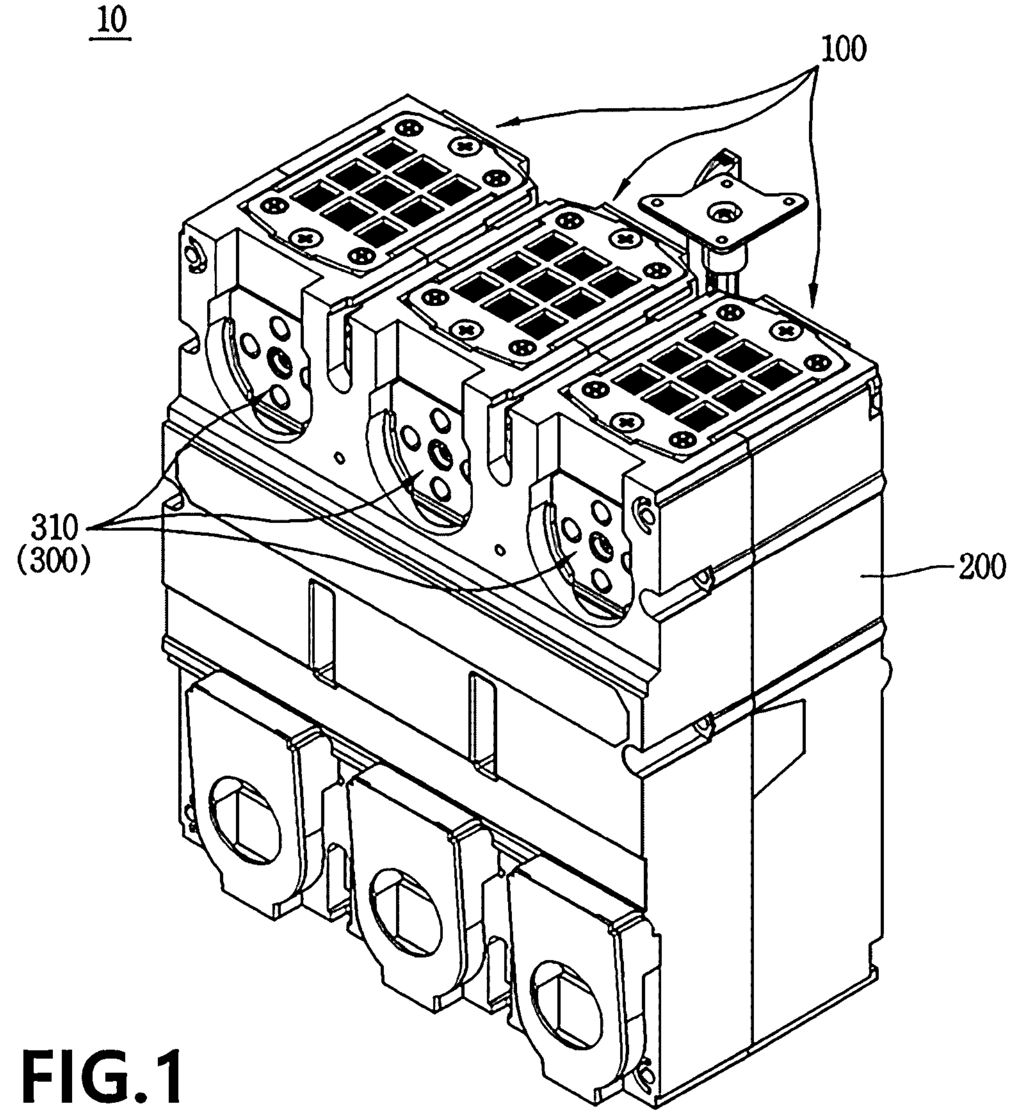
FIG. 1 is a perspective view of an air circuit breaker according to an exemplary embodiment of the present disclosure.

Hereinafter, an arc extinguishing unit and an air circuit breaker including the same according to an embodiment of the present disclosure will be described in detail with reference to the accompanying drawings.

In the following description, in order to clarify the features of the present disclosure, descriptions of some components may be omitted.

1. Term Definition

The term "energization" used in the following description means that a current or an electrical signal is transmitted between one or more members.

The term "air circuit breaker" used in the following description refers to a circuit breaker configured to extinguish an arc using air or compressed air. It is assumed that each configuration described below is applied to an air circuit breaker.

However, each configuration described below may also be applied to an air-blast circuit breaker, a compressed air circuit breaker, a gas circuit breaker, an oil circuit breaker, a vacuum circuit breaker, and the like.

The terms “upper side or above”, “lower side or below”, “left side”, “right side”, “front side”, and “rear side” used in the following description will be understood with reference to the coordinate system shown in FIG. 1.

2. Description of a Configuration of an Air Circuit Breaker 10 According to an Embodiment of the Present Disclosure Referring to FIGS. 1 to 3, the air circuit breaker 10 according to an embodiment of the present disclosure includes a cover unit 200, a driving unit 190, a circuit breaking unit 300, and an arc extinguishing unit 100.

Hereinafter, each configuration of the air circuit breaker 10 according to an embodiment of the present disclosure will be described with reference to the accompanying drawings, but the arc extinguishing unit 100 will be described separately.

(1) Description of the Cover Unit 200

Figure 2:
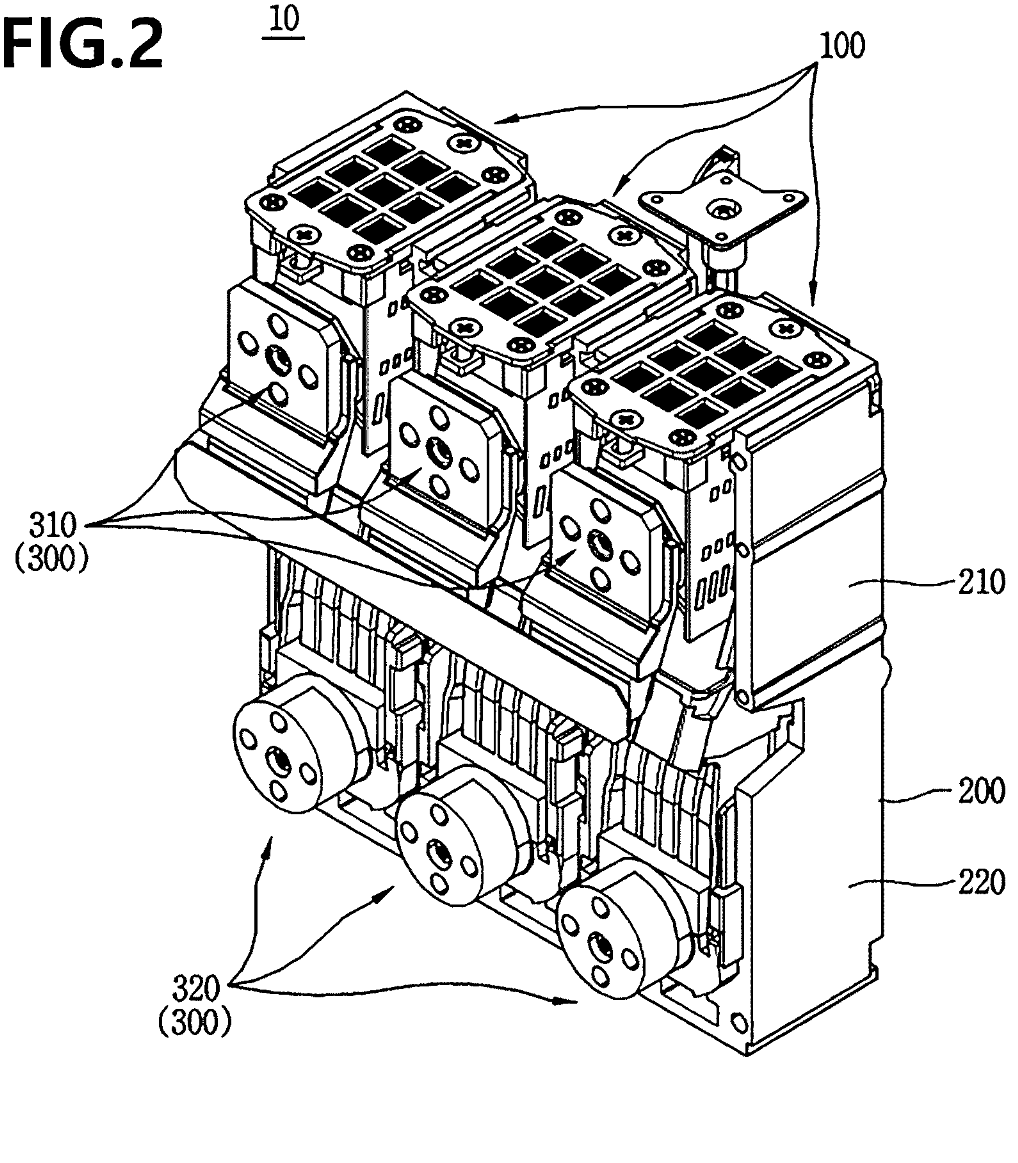
FIG. 2 is a perspective view illustrating a state in which a rear cover is removed from the air circuit breaker of FIG. 1.
Figure 3:
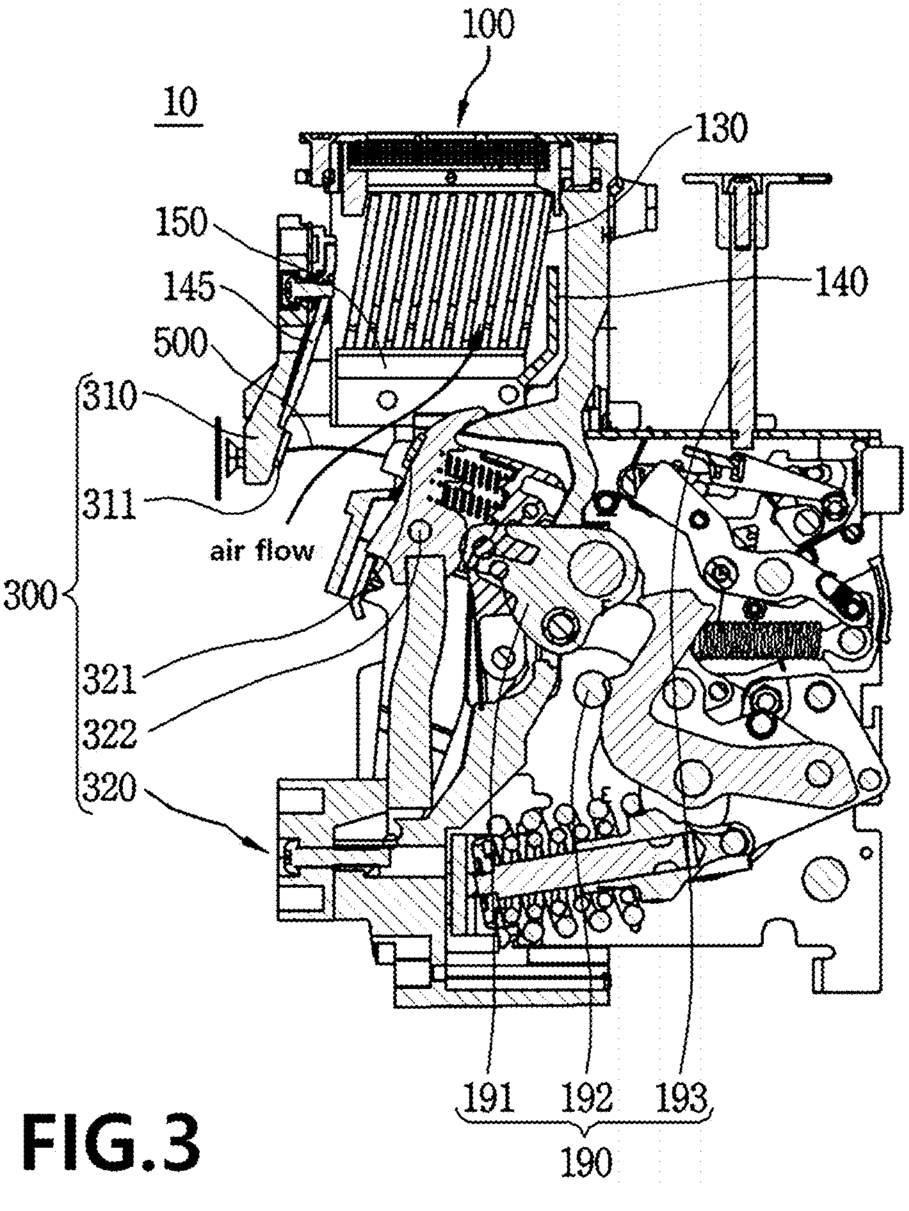
FIG. 3 is a cross-sectional view illustrating a state in which a rear cover is removed from the air circuit breaker of FIG. 1.
Figure 4:
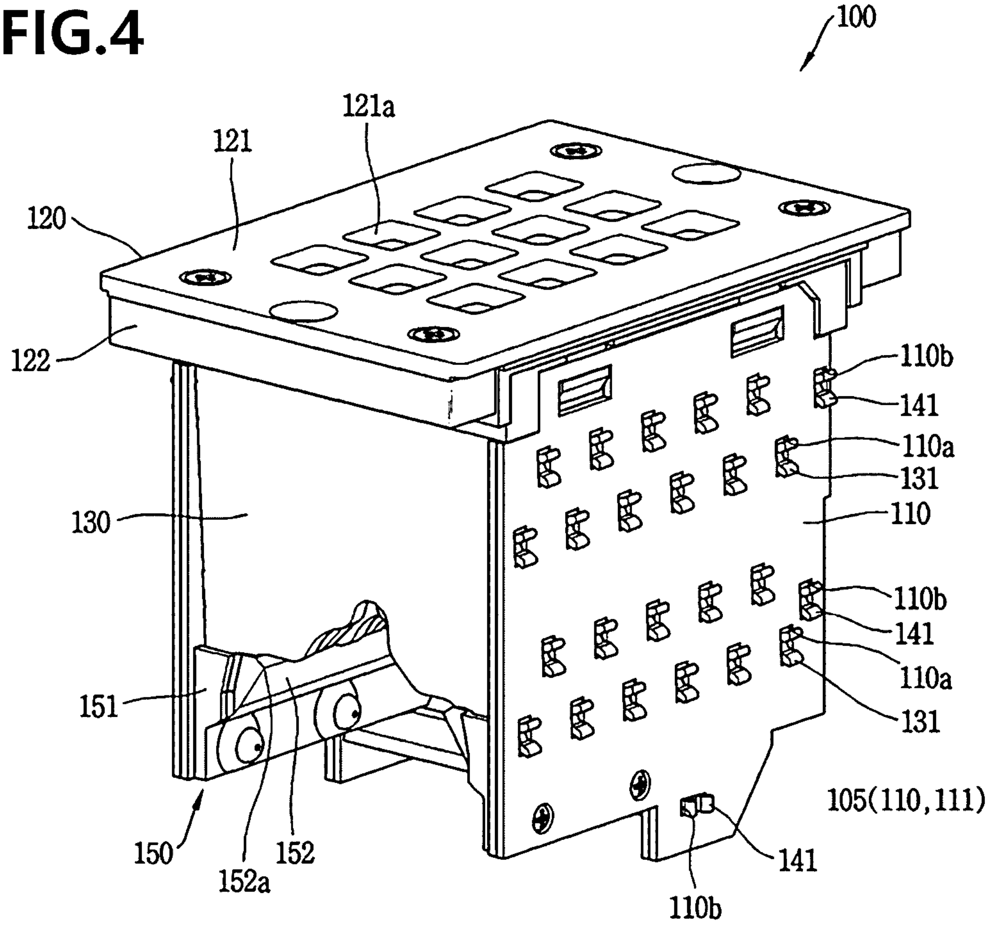
FIG. 4 is a perspective view illustrating an exemplary embodiment of an arc extinguishing unit provided in the air circuit breaker of FIG. 1.
Figure 5:
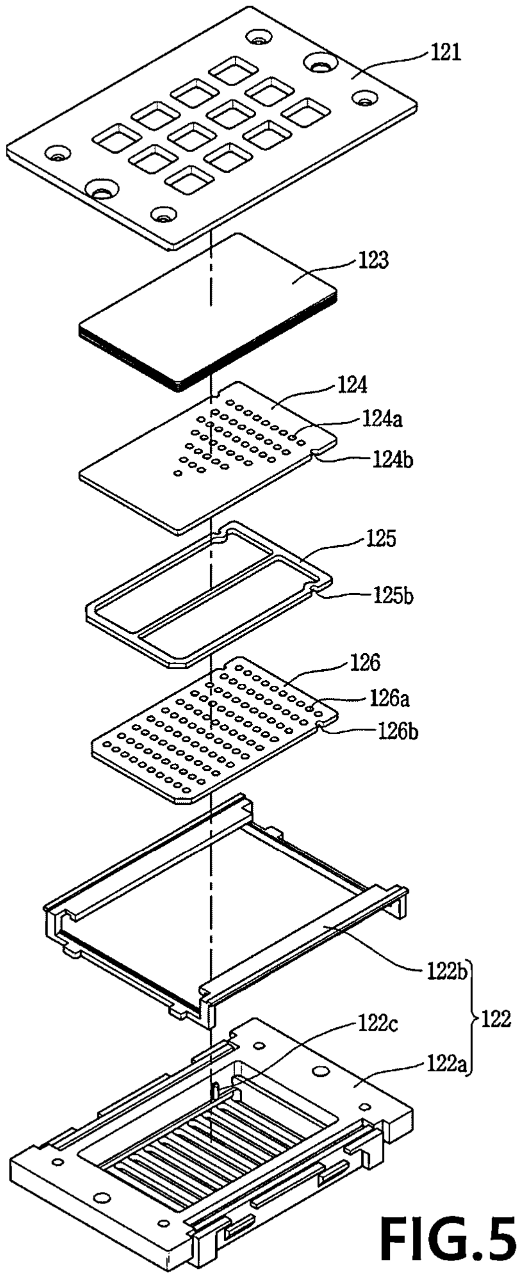
FIG. 5 is an exploded perspective view illustrating an exemplary embodiment of a cover assembly of the arc extinguishing unit of FIG. 4.
Figure 6:
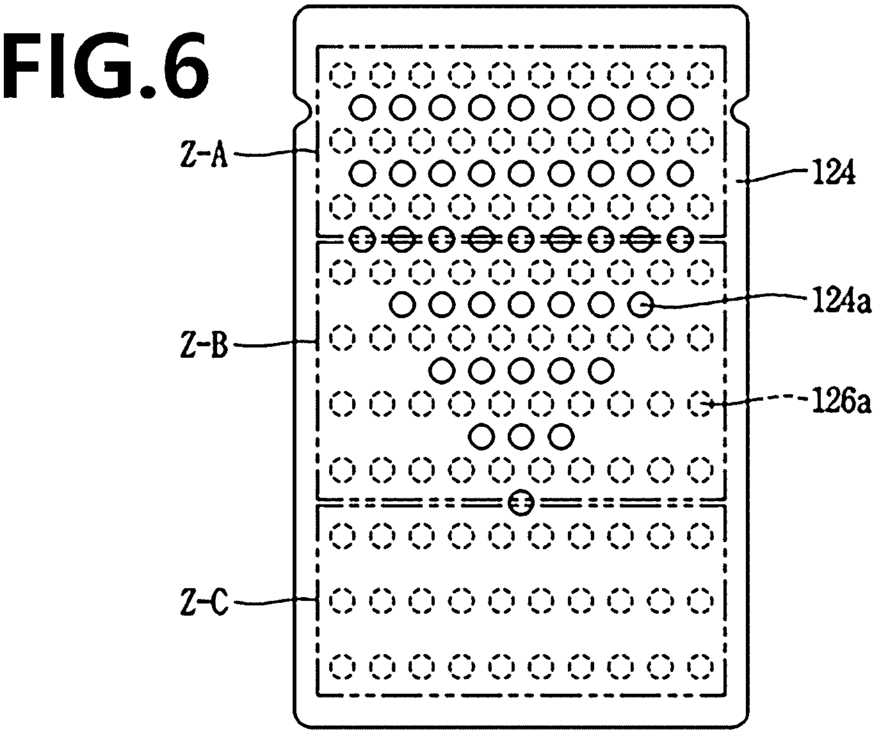
FIG. 6 is a view illustrating a first insulation filter, a spacer, and a second insulation filter of the cover assembly of FIG. 5 overlapping each other.
Figure 6:
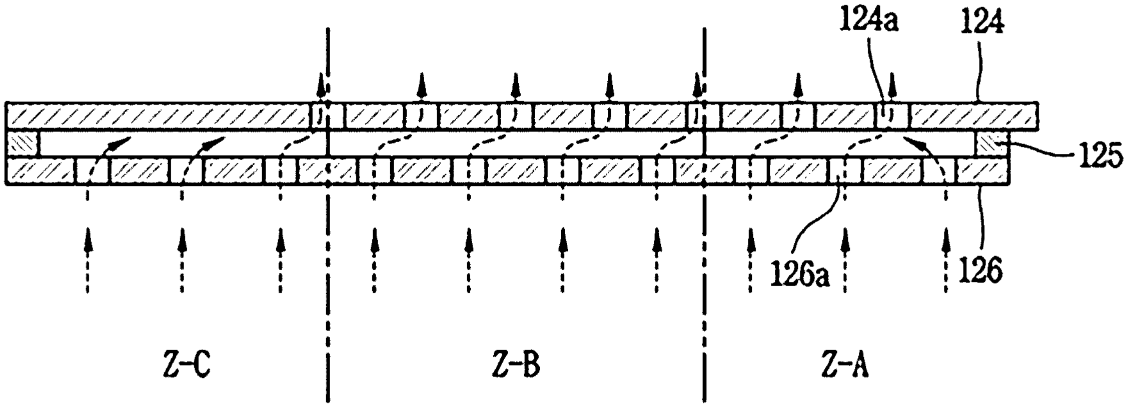
Figure 7:
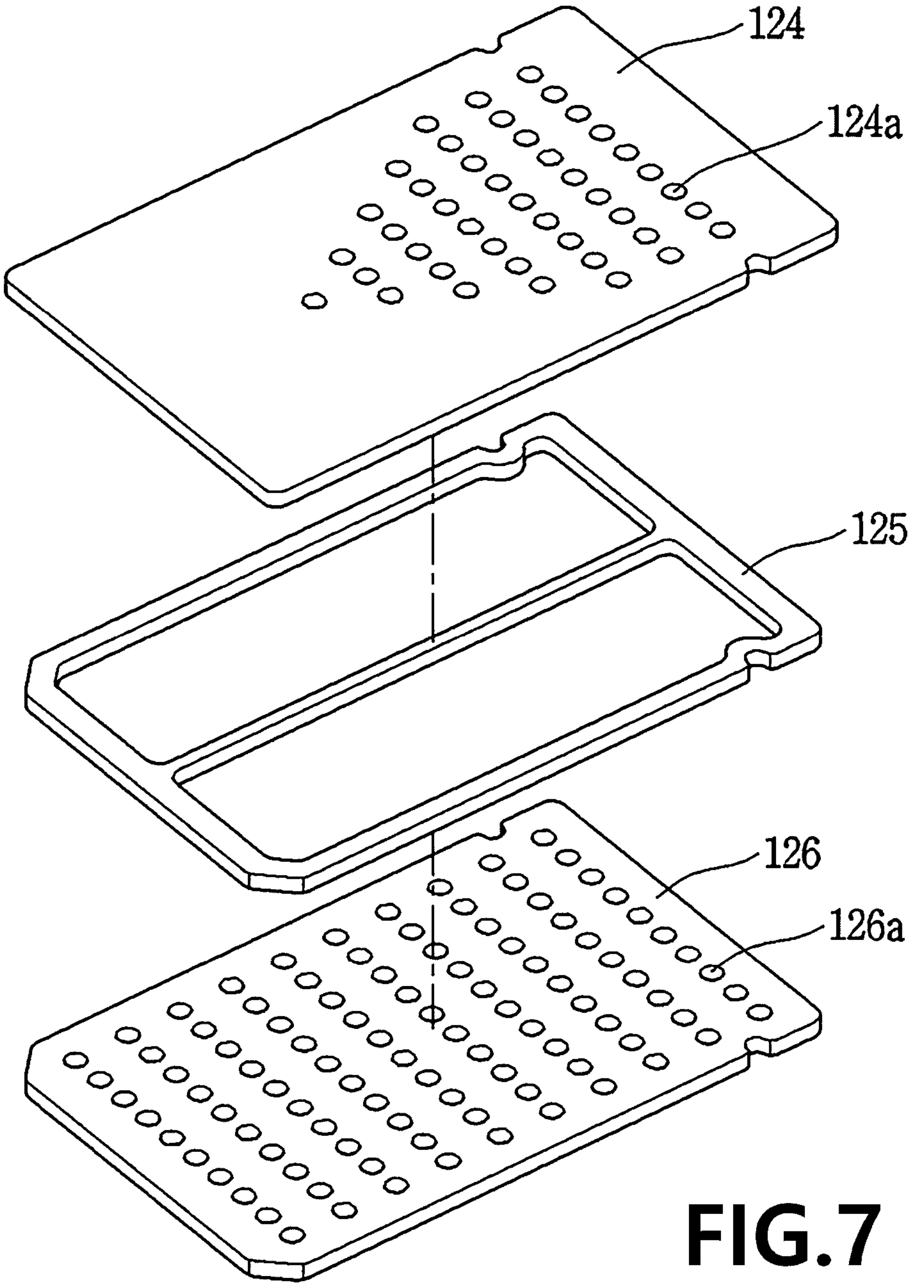
FIG. 7 is an enlarged view for explaining a first insulation filter, a spacer, and a second insulation filter of the cover assembly of FIG. 5.

Referring to FIGS. 1 to 3, the air circuit breaker 10 according to an embodiment of the present disclosure includes a cover unit 200.

The cover unit 200 forms the outer shape of the air circuit breaker 10. In addition, a space is formed inside the cover unit 200, and each component for operating the air circuit breaker 10 can be mounted in the space.

That is, the cover unit 200 functions as a kind of housing.

The cover unit 200 may be formed of a material with high heat resistance and high rigidity. This is to prevent damage to each component mounted inside and to prevent damage caused by an arc generated inside. In an embodiment, the cover unit 200 may be formed of synthetic resin or reinforced plastic.

In the illustrated embodiment, the cover unit 200 has a quadrangular pillar shape with a height in the up and down direction. The shape of the cover unit 200 may be provided in any shape capable of mounting components for operating the air circuit breaker 10 therein.

The inner space of the cover unit 200 is energized to the outside. Each component mounted inside the cover unit 200 may be energizably connected to an external power source or load.

In the illustrated embodiment, the cover unit 200 includes an upper cover 210 and a lower cover 220.

The upper cover 210 forms the upper side of the cover unit 200. The upper cover 210 is positioned above the lower cover 220. In an embodiment, the upper cover 210 and the lower cover 220 may be integrally formed.

A space is formed inside the upper cover 210. Various components provided in the air circuit breaker 10 are mounted in the space. In an embodiment, the circuit breaking unit 300, the arc extinguishing unit 100, and the like may be mounted in the inner space of the upper cover 210.

The inner space of the upper cover 210 communicates with the inner space of the lower cover 220. Components such as the circuit breaking unit 300 may be accommodated throughout the inner space of the upper cover 210 and the inner space of the lower cover 220.

The arc extinguishing unit 100 is located on one side of the upper cover 210, i.e., on the upper surface in the illustrated embodiment. The arc extinguishing unit 100 may be partially exposed on the upper surface of the upper cover 210. The arc generated in the inner space of the upper cover 210 may pass through the arc extinguishing unit 100 and may be extinguished and discharged to the outside of the air circuit breaker 10.

On the other side of the upper cover 210, i.e., the front side in the illustrated embodiment, a fixed contact terminal 310 of the circuit breaking unit 300 is exposed. The fixed contact terminal 310 may be energizably connected to an external power source or load through the exposed portion.

In the illustrated embodiment, the upper cover 210 includes a first upper cover and a second upper cover.

The first upper cover is configured to cover one side of the upper side of the air circuit breaker 10, i.e., the front side in the illustrated embodiment. The first upper cover is coupled to the second upper cover by any fastening means.

An opening is formed in the first upper cover. The fixed contact terminal 310 may be exposed to the outside through the opening. In the illustrated embodiment, three of said openings are formed in the left-right direction.

The second upper cover is configured to cover the other side of the upper side of the air circuit breaker 10, i.e., the rear side in the illustrated embodiment. The second upper cover is coupled to the first upper cover by any fastening means.

The lower cover 220 forms the lower side of the cover unit 200. The lower cover 220 is positioned below the upper cover 210.

A space is formed inside the lower cover 220. Various components provided in the air circuit breaker 10 are mounted in the space. In an embodiment, the driving unit 190, the circuit breaking unit 300, and the like may be mounted in the inner space of the lower cover 220.

The inner space of the lower cover 220 communicates with the inner space of the upper cover 210. Components such as the circuit breaking unit 300 may be accommodated throughout the inner space of the lower cover 220 and the inner space of the upper cover 210.

On one side of the lower cover 220, i.e., the front side in the illustrated embodiment, a movable contact terminal 320 of the circuit breaking unit 300 is located. The movable contact terminal 320 may be exposed to the outside through an opening formed in the lower cover 220. The movable contact terminal 320 may be energizably connected to an external power source or load through the exposed portion.

(2) Description of the Driving Unit 190

Referring to FIGS. 1 to 3, the air circuit breaker 10 according to an embodiment of the present disclosure includes a driving unit 190.

The driving unit 190 is rotated as the fixed contact 311 and the movable contact 321 of the circuit breaking unit 300 are spaced apart, thereby performing a trip mechanism. Accordingly, the air circuit breaker 10 may break energization with the outside, and the user can recognize that an operation to break energization has been performed.

The driving unit 190 is accommodated inside the air circuit breaker 10. Specifically, the driving unit 190 is partially accommodated in a space inside the cover unit 200. In addition, the remaining portion of the driving unit 190 is accommodated inside a case provided on one side (the rear side in the illustrated embodiment) of the cover unit 200, which is not given with reference numerals.

The driving unit 190 is connected to the circuit breaking unit 300. Specifically, a crossbar 192 of the driving unit 190 is configured to rotate together with the rotation of the movable contact terminal 320 of the circuit breaking unit 300.

Therefore, when the movable contact terminal 320 of the circuit breaking unit 300 is rotated and moved, the driving unit 190 may be rotated together. The driving unit 190 is rotatably accommodated inside the air circuit breaker 10.

In the illustrated embodiment, the driving unit 190 includes a shooter 191, a crossbar 192 and a lever 193.

The shooter 191 is rotated together as the movable contact terminal 320 of the circuit breaking unit 300 is rotated away from the fixed contact terminal 310. The shooter 191 is connected to the crossbar 192 and the lever 193.

Specifically, one end of the shooter 191 is restrained by the crossbar 192. An elastic member is provided at the other end of the shooter 191. Accordingly, in a state in which the fixed contact 311 and the movable contact 321 are in contact, the shooter 191 presses the elastic member and stores restoring force. The external force for the pressing may be provided by a state in which the crossbar 192 is rotated toward the fixed contact terminal 310.

When the movable contact 321 is spaced apart from the fixed contact 311, the movable contact terminal 320 is rotated in a direction away from the fixed contact terminal 310. Accordingly, the crossbar 192 is also rotated, and one end of the shooter 191 is released and rotated by the restoring force provided by the elastic member.

The shooter 191 is connected to the lever 193. As the shooter 191 is rotated and strikes the lever 193, the lever 193 may also be rotated, and a trip mechanism may be performed.

The crossbar 192 is connected to the movable contact terminal 320 and is rotated together as the movable contact terminal 320 is rotated. Accordingly, the shooter 191 restrained by the crossbar 192 may be released, and a trip mechanism may be performed.

The crossbar 192 may extend between the plurality of circuit breaking units 300. In the illustrated embodiment, a total of three movable contact terminals 320 of the circuit breaking unit 300 are provided and disposed in the left-right direction. The crossbar 192 may be connected through the plurality of movable contact terminals 320 disposed in the left-right direction.

The crossbar 192 contacts the one end of the shooter 191 to restrain the shooter 191. When the crossbar 192 is rotated together with the movable contact terminal 320, the crossbar 192 releases the one end of the shooter 191.

The lever 193 may be hit and rotated by the rotating shooter 191. The lever 193 may be partially exposed to the outside of the air circuit breaker 10. When the trip mechanism is performed by the circuit breaking unit 300, the lever 193 is rotated in a preset direction.

Accordingly, the user can easily recognize that the trip mechanism has been performed. In addition, the user can rotate the lever 193 to adjust the air circuit breaker 10 to a state in which it can be energized again.

The process of performing the trip mechanism by the driving unit 190 is a well-known technique, and thus a detailed description thereof will be omitted.

(3) Description of the Circuit Breaking Unit 300

Referring to FIGS. 1 to 3, the air circuit breaker 10 according to an embodiment of the present disclosure includes a circuit breaking unit 300.

The circuit breaking unit 300 includes a fixed contact terminal 310 and a movable contact terminal 320 spaced apart from each other or in contact with each other. When the fixed contact terminal 310 and the movable contact terminal 320 are in contact with each other, the air circuit breaker 10 may be energized with an external power source or load. When the fixed contact terminal 310 and the movable contact terminal 320 are spaced apart from each other, the air circuit breaker 10 is de-energized from an external power source or load.

The circuit breaking unit 300 is accommodated inside the air circuit breaker 10. Specifically, the circuit breaking unit 300 is rotatably accommodated in the inner space of the cover unit 200.

The circuit breaking unit 300 may be energized with the outside. In an embodiment, current from an external power source or load may flow into any one of the fixed contact terminal 310 and the movable contact terminal 320. In addition, current may flow from the other one of the fixed contact terminal 310 and the movable contact terminal 320 to an external power source or load.

The circuit breaking unit 300 may be partially exposed to the outside of the air circuit breaker 10. Accordingly, the circuit breaking unit 300 may be energizably connected to an external power source or load through a member such as a conducting wire (not shown).

A plurality of circuit breaking units 300 may be provided. The plurality of circuit breaking units 300 may be disposed to be spaced apart from each other in one direction. A partition wall (not shown) may be provided between each of the circuit breaking units 300 to prevent interference between currents energized to each of the circuit breaking units 300.

In the illustrated embodiment, three circuit breaking units 300 are provided. In addition, the three circuit breaking units 300 are disposed to be spaced apart from each other in the left-right direction of the air circuit breaker 10. This is because the air circuit breaker 10 according to an embodiment of the present disclosure is energized with three-phase currents such as R phase, S phase and T phase or U phase, V phase and W phase.

The number of circuit breaking units 300 may be changed according to the number of phases of current flowing through the air circuit breaker 10.

In the illustrated embodiment, the fixed contact terminal 310 is exposed to the outside through an opening formed on the front side of the upper cover 210.

The fixed contact terminal 310 may be formed of a material having electrical conductivity. In an embodiment, the fixed contact terminal 310 may be formed of copper (Cu) or iron (Fe) and an alloy material including the same.

In the illustrated embodiment, the fixed contact terminal 310 includes a fixed contact 311.

The fixed contact 311 may be in contact with or spaced apart from the movable contact 321. The fixed contact 311 is located on one side of the fixed contact terminal 310 towards the movable contact terminal 320, i.e., on the rear side in the illustrated embodiment.

The fixed contact 311 is energized with the fixed contact terminal 310. In the illustrated embodiment, the fixed contact 311 is located on the rear side of the fixed contact terminal 310. In an embodiment, the fixed contact 311 may be integrally formed with the fixed contact terminal 310.

When the fixed contact 311 and the movable contact 321 are in contact with each other, the air circuit breaker 10 is energizably connected to an external power source or load. In addition, when the fixed contact 311 is spaced apart from the movable contact 321, the air circuit breaker 10 is de-energized from an external power source or load.

The movable contact terminal 320 may be in contact with or spaced apart from the fixed contact terminal 310. It is as described above that the air circuit breaker 10 can be energized or de-energized from an external power source or load by contact and separation between the movable contact terminal 320 and the fixed contact terminal 310.

The movable contact terminal 320 is rotatably installed in the inner space of the cover unit 200. The movable contact terminal 320 may be rotated in a direction toward the fixed contact terminal 310 and in a direction away from the fixed contact terminal 310.

In the illustrated embodiment, the movable contact terminal 320 is accommodated in the inner spaces of the upper cover 210 and the lower cover 220. It is as described above that the inner spaces of the upper cover 210 and the lower cover 220 may communicate with each other.

The movable contact terminal 320 may be partially exposed to the outside of the air circuit breaker 10. Through the exposed portion, the movable contact terminal 320 may be energizably connected to an external power source or load.

In the illustrated embodiment, the movable contact terminal 320 is exposed to the outside through an opening formed on the front side of the lower cover 220.

The movable contact terminal 320 may be formed of a material having electrical conductivity. In an embodiment, the movable contact terminal 320 may be formed of copper or iron and an alloy material including the same.

The movable contact terminal 320 is connected to the driving unit 190. Specifically, the movable contact terminal 320 is connected to the crossbar 192 of the driving unit 190. In an embodiment, the crossbar 192 may be coupled through the movable contact terminal 320.

When the movable contact terminal 320 is rotated, the crossbar 192 may also be rotated. Accordingly, the driving unit 190 may be operated to perform the trip mechanism.

In the illustrated embodiment, the movable contact terminal 320 includes a movable contact 321 and a rotation shaft 322.

The movable contact 321 may be in contact with or spaced apart from the fixed contact 311. The movable contact 321 is located on one side of the movable contact terminal 320 towards the fixed contact terminal 310, i.e., on the front side in the illustrated embodiment.

The movable contact 321 may be rotated together with the movable contact terminal 320. When the movable contact terminal 320 is rotated toward the fixed contact terminal 310, the movable contact 321 may also be rotated toward the fixed contact 311 to contact the fixed contact 311.

In addition, when the movable contact terminal 320 is rotated in a direction away from the fixed contact terminal 310, the movable contact 321 may also be spaced apart from the fixed contact 311.

The movable contact 321 is energized with the movable contact terminal 320. In the illustrated embodiment, the movable contact 321 is located on the front side of the movable contact terminal 320. In an embodiment, the movable contact 321 may be integrally formed with the movable contact terminal 320.

It is as described above that the air circuit breaker 10 is energized with or de-energized from an external power source or load by contact and separation between the movable contact 321 and the fixed contact 311.

Hereinafter, a situation in which an arc is generated will be described.

When the fixed contact 311 and the movable contact 321 are spaced apart from each other in a state in which the fixed contact 311 and the movable contact 321 are brought into contact with each other and are energized, an arc is generated. The air circuit breaker 10 according to an embodiment of the present disclosure includes various components for effectively extinguishing the generated arc within the arc extinguishing unit. This will be described later in detail.

The rotation shaft 322 is a portion where the movable contact terminal 320 is rotatably coupled to the cover unit 200. The movable contact terminal 320 may be rotated in a direction toward the fixed contact terminal 310 or in a direction away from the fixed contact terminal 310 about the rotation shaft 322.

The rotation shaft 322 is located on the other side of the movable contact terminal 320 opposite to the fixed contact terminal 310, i.e., on the rear side in the illustrated embodiment.

3. Description of an Arc Extinguishing Unit 100 According to an Embodiment of the Present Disclosure Referring to FIGS. 1 to 14, the air circuit breaker 10 according to an embodiment of the present disclosure includes an arc extinguishing unit 100.

The arc extinguishing unit 100 is configured to extinguish an arc generated when the fixed contact 311 and the movable contact 321 are spaced apart. The generated arc may pass through the arc extinguishing unit 100 and be discharged to the outside of the air circuit breaker 10 after being extinguished and cooled.

The arc extinguishing unit 100 is coupled to the cover unit 200. One side of the arc extinguishing unit 100 for arc discharge may be exposed to the outside of the cover unit 200. In the illustrated embodiment, the upper side of the arc extinguishing unit 100 is exposed to the outside of the cover unit 200.

The arc extinguishing unit 100 is partially accommodated in the cover unit 200. The remaining portion of the arc extinguishing unit 100 except for the portion exposed to the outside may be accommodated in the inner space of the cover unit 200. In the illustrated embodiment, the arc extinguishing unit 100 is partially accommodated on the upper side of the upper cover 210.

The arrangement may be changed according to the position of the fixed contact 311 and the movable contact 312. That is, the arc extinguishing unit 100 may be positioned fairly adjacent to the fixed contact 311 and the movable contact 312. Accordingly, an arc formed by extending along the movable contact 312 rotated away from the fixed contact 311 may easily enter the arc extinguishing unit 100.

A plurality of arc extinguishing units 100 may be provided. The plurality of arc extinguishing units 100 may be disposed to be physically and electrically spaced apart from each other. In the illustrated embodiment, three arc extinguishing units 100 are provided. As described above, this is due to the passage of three-phase current through the air circuit breaker 10 according to an embodiment of the present disclosure.

That is, each arc extinguishing unit 100 is positioned adjacent to each fixed contact 311 and movable contact 321. In the illustrated embodiment, each arc extinguishing unit 100 is positioned adjacent to the upper side of each fixed contact 311 and movable contact 321.

It will be understood that each arc extinguishing unit 100 is configured to extinguish an arc generated when the current of each phase energized to each circuit breaking unit 300 is broken. Air flows in from the lower end of the arc extinguishing unit 100, extinguishes the arc, and is discharged upward from the arc extinguishing unit 100.

The arc extinguishing units 100 may be disposed adjacent to each other. In the illustrated embodiment, the three arc extinguishing units 100 are disposed side by side in the left-right direction of the air circuit breaker 10.

In the illustrated embodiment, the arc extinguishing unit 100 includes a side plate part 105, a grid 130, and a cover assembly 120.

Side plate part 105 forms both sides of arc extinguishing unit 100, i.e., the right side and the left side in the illustrated embodiment. The side plate part 105 is coupled to each component of the arc extinguishing unit 100 and supports the components.

Specifically, the side plate part 105 is coupled to the grid 130, the cover assembly 120, an arc guide 150 and an arc runner 140.

A plurality of side plate parts 105 are provided. The plurality of side plate parts 105 may be spaced apart from each other and disposed to face each other. In the illustrated embodiment, two side plate parts 105 are provided, forming the right and left sides of the arc extinguishing unit 100, respectively.

The side plate part 105 may be formed of an insulating material. This is to prevent the generated arc from flowing toward the side plate part 105.

The side plate part 105 may be formed of a heat-resistant material. This is to prevent damage or shape deformation by the generated arc.

In an embodiment, the side plate part 105 includes a gassing material 111 that generates molecules that extinguish the arc when heat generated by the arc is applied.

Specifically, when heat generated by an arc is applied to the gassing material 111, the gassing material 111 emits molecules capable of extinguishing the arc. In other words, the gassing material 111 can generate gases that can extinguish the arc. Through this, the arc generated in the arc extinguishing unit 100 can be quickly extinguished.

An outer support plate 110 is disposed outside the gassing material 111. The outer support plate 110 is coupled to the grid 130. The outer support plate 110 may press and fix the gassing material 111 toward the grid 130.

Since the aforementioned gassing material 111 emits molecules for arc extinguishing when heated by an arc, physical strength may be weakened. In addition, the heat generated by the arc can momentarily reach several thousand degrees Celsius. Accordingly, the physical strength of the gassing material 111 may be weakened. Accordingly, the outer support plate 110 disposed outside the gassing material 111 may serve to support the gassing material 111.

In this case, the outer support plate 110 may include a fiber-reinforced polyester composite. Specifically, the outer support plate 110 may be made of a mat containing glass, that is, a glass fiber reinforced material so that physical strength is not weakened by the heat of the arc. Through this, the outer support plate 110 can be reinforced in mechanical and thermal strength.

For example, the outer support plate 110 may be made of a substantially fiber-reinforced polyester composite selected from materials sold under the trademark Altherm 800 or Delmat polyester by the company VON ROLL. In addition, the outer support plate 110 may be made of a glass fiber reinforced material selected from materials sold under the trademark Delmat Epoxy 68660.

The grid 130 may include a protrusion part 131 protruding from a side surface to be coupled to the side plate part 105.

Specifically, the protrusion part 131 may include a body part 131*a* extending from the side of the grid 130, and a first protrusion 131*b* and a second protrusion 131*c* extending from the body part 131*a* to both sides.

In the illustrated embodiment, the first protrusion 131*b* and the second protrusion 131*c* are spaced apart from each other and extend outwardly from the body part 131*a*. The first protrusion 131*b* and the second protrusion 131*c* may extend in directions away from each other in a symmetrical manner about the center of the body part 131*a*.

As described above, as the first protrusion 131*b* and the second protrusion 131*c* extend in directions away from each other symmetrically about the center of the body part 131*a*, a U-groove 133*a* may be formed in a space between the first protrusion 131*b* and the second protrusion 131*c*. Specifically, a U-groove 133*a* capable of absorbing left and right deformation of the first protrusion 131*b* and the second protrusion 131*c* due to an external force may be formed.

In addition, between the first protrusion 131*b* and the second protrusion 131*c* and the body part 131*a*, a concave groove 133*b* capable of absorbing back and forth deformation of the first protrusion 131*b* and the second protrusion 131*c* by an external force may be formed.

The first protrusion 131*b* and the second protrusion 131*c* may be formed of a first surface 132*a* to a fifth surface 132*e* from the space forming the U-groove 133*a* to the place forming the concave groove 133*b*.

Specifically, they may include a first surface 132*a* constituting the U-groove 133*a*; a second surface 132*b* extending from the first surface 132*a* to extend at a predetermined angle in a direction in which the first protrusion 131*b* and the second protrusion 131*c* go away from each other; a third surface 132*c* extending from the second surface 132*b* and forming a surface including a flat surface toward the outside; a fourth surface 132*d* forming a predetermined angle with the third surface 132*c* and parallel or at a small angle with the second surface 132*b*; and a fifth surface 132*e* extending at a predetermined angle with the fourth surface 132*d* and forming a concave groove 133*b* with the fourth surface 132*d*. In addition, the fifth surface 132*e* may be connected to the body part 131*a*.

In this case, when the protrusion part 131 receives pressure from the outside, the first protrusion 131*b* and the second protrusion 131*c* may show two types of behavior.

Specifically, when the protrusion 131 receives pressure from the outside, the protrusion part 131 may behave as follows.

For example, when external force F2 is applied to the outside (a region adjacent to the fourth surface 132*d*) of the third surface 132*c*, the first protrusion 131*b* may be bent toward the concave groove 133*b*. In this case, the concave groove 133*b* may serve as an avoidance space in which the first protrusion 131*b* can bend toward the concave groove 133*b*. In this case, since the concave groove 133*b* is also formed in the second protrusion 131*c*, the same behavior can be performed when an external force is applied to the outside of the third surface 132*c* of the second protrusion 131*c*.

In addition, when external force F1 is applied to the center or inner side of the third surface 132*c*, the second protrusion 131*c* may be moved in a direction away from the first protrusion 131*b*. Even in this case, since the concave groove 133*b* is formed, the second protrusion 131*c* can be easily moved in a direction away from the first protrusion 131*b*.

Through the behavior of the first protrusion 131*b* and the second protrusion 131*c* as described above, even when the grid 130 receives lateral pressure from the outside, it is possible to prevent the first protrusion 131*b* and the second protrusion 131*c* from being damaged or permanently deformed.

In particular, since the gassing material 111, which may deteriorate physical rigidity due to the heat of the arc, is disposed inside the side plate part 105, the coupling between the grid 130 and the side plate part 105 may be weakened. Therefore, as the protrusion part 131 of the grid 130 is formed of the body part 131*a*, the first protrusion 131*b*, and the second protrusion 131*c*, the arc extinguishing unit 100 according to an embodiment of the present disclosure y may be firmly coupled to the gassing material 111 and the outer support plate 110. In addition, the U-groove 133*a* and the concave groove 133*b* are formed in the protrusion part 131 to provide space for the first protrusion 131*b* and second protrusion 131*c* to avoid external force, thereby reducing the damage or permanent deformation of the first protrusion 131*b* and the second protrusion 131*c* due to an external force.

A plurality of through holes are formed in the side plate part 105. The grid 130 and the arc runner 140 may be inserted and coupled to some of the through holes. In addition, fastening members for fastening the cover assembly 120 and the arc guide 150 to the side plate part 105 may be coupled through some of the other through holes.

The side plate part 105 is coupled to the grid 130. Specifically, protrusion parts 131 provided at opposite sides of the grid 130, i.e., the right end and the left end in the illustrated embodiment, are inserted into and coupled to some of the through holes of the side plate part 105.

Through holes into which the protrusion parts 131 are inserted are formed in the gassing material 111 and the outer support plate 110.

Figure 8:
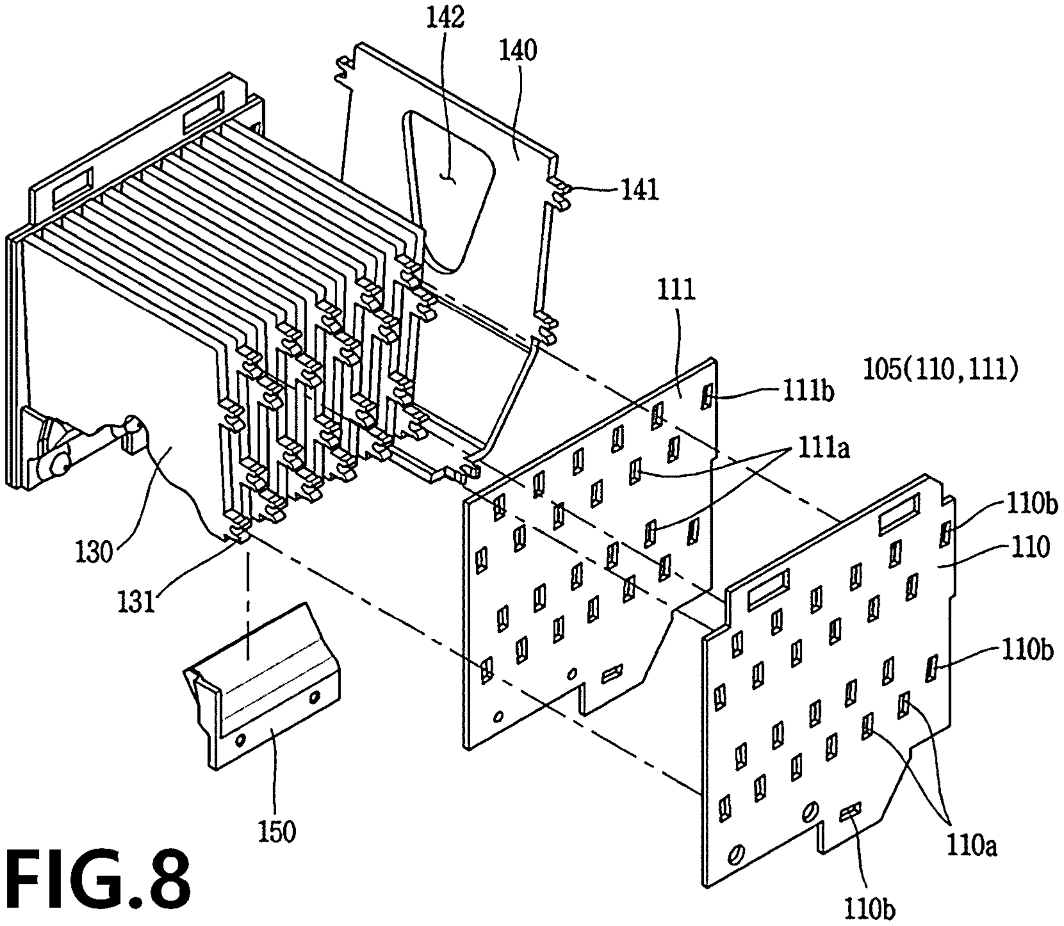
FIG. 8 is an exploded perspective view for explaining a coupling of a grid and a side plate part of the arc extinguishing unit of FIG. 4.
Figure 9:
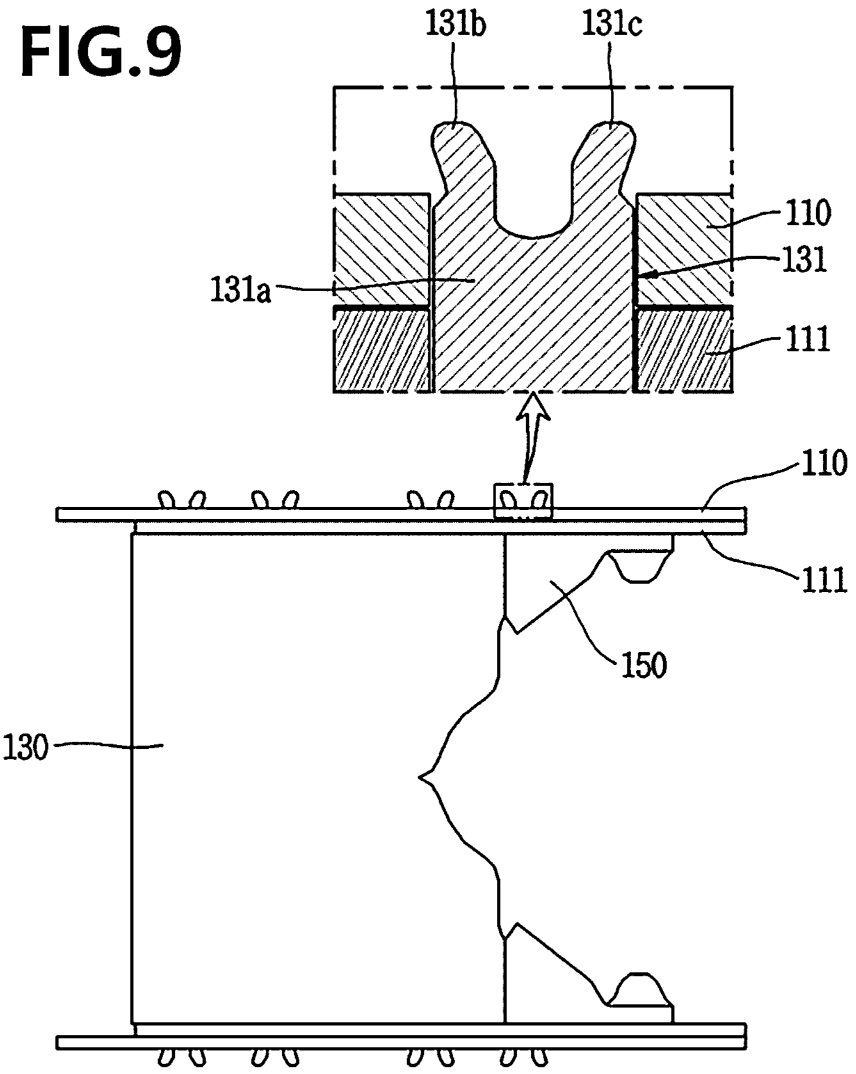
FIG. 9 is a side view for explaining a coupling of a grid and a side plate part according to an embodiment of the present disclosure.

Referring to FIGS. 8 and 9, a first through hole 110*a* into which the protrusion part 131 of the grid 130 is inserted and a second through hole 110*b* into which the arc runner protrusion part 141 is inserted may be formed in the outer support plate 110.

And a first through hole 111*a* into which the protrusion part 131 of the grid 130 is inserted and a second through hole 111*b* into which the arc runner protrusion part 141 is inserted may also be formed in the gassing material 111.

Each through hole of the outer support plate 110 and the gassing material 111 is formed at a position corresponding to each other so that the protrusion parts 131 formed on the grid 130 and the arc runner 140 can be simultaneously inserted.

In this case, the protrusion part 131 of the grid 130 may be vertically disposed along the longitudinal direction of the grid 130. Accordingly, the first through holes 110*a* and 111*a* of the gassing material 111 and the outer support plate 110 may be formed vertically.

However, in another embodiment, the protrusion part 131 of the grid 130 may be formed in a horizontal direction perpendicular to the longitudinal direction of the grid 130. Specifically, referring to FIG. 14, the protrusion part 131 of the grid 130 is formed in a direction perpendicular to the longitudinal direction of the grid 130. In this case, the first through holes of the outer support plate 110 and the gassing material 111 may be formed in the horizontal direction as shown. Meanwhile, in another embodiment, the arc runner protrusion part 141 may also be formed in a direction perpendicular to the longitudinal direction.

In another embodiment, the outer support plate 110 may include a central member 110*c* formed in the through hole and extending across the through hole so that the first protrusion 131*b* and the second protrusion 131*c* can be inserted separately from each other.

Figure 10:
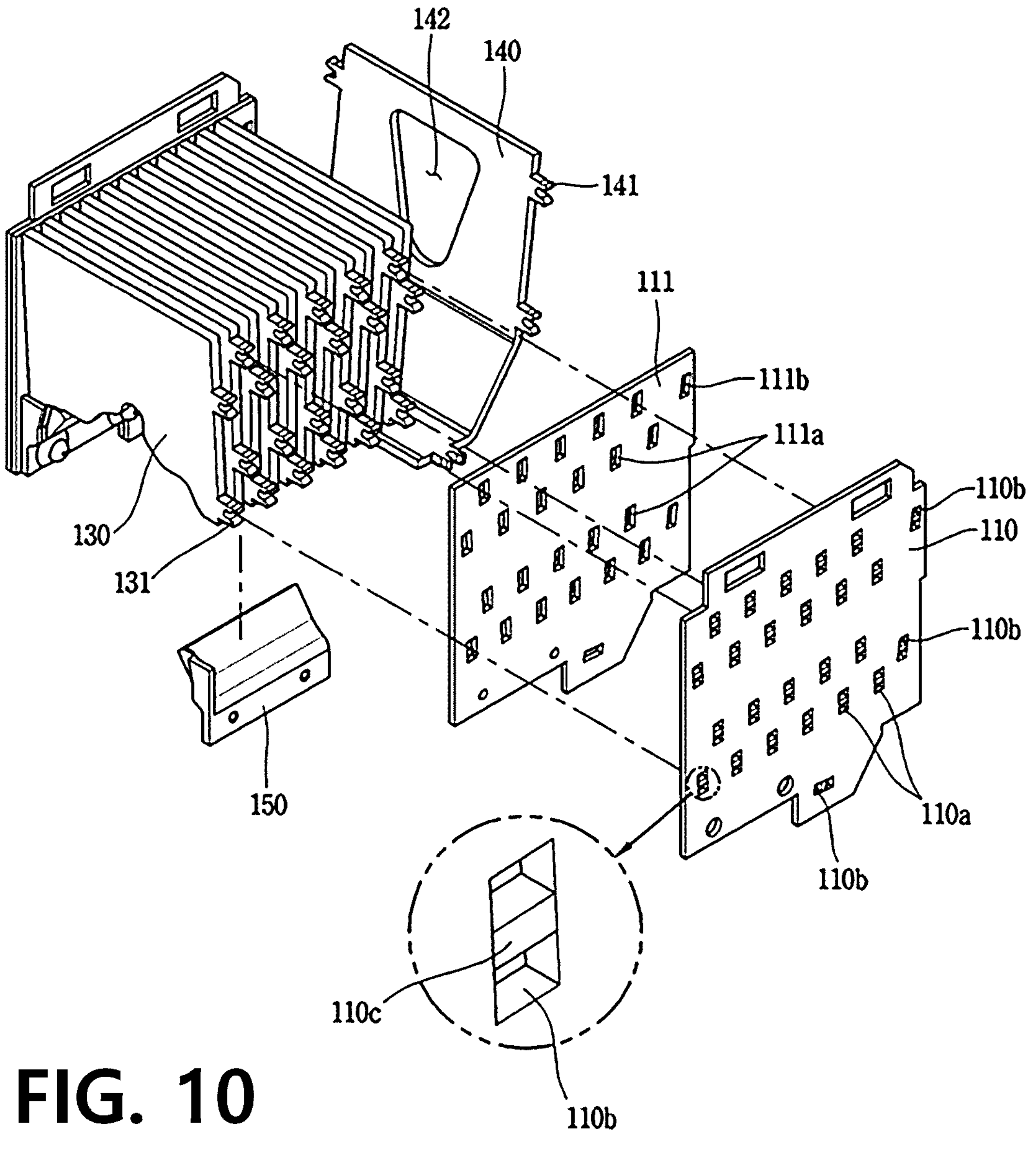
FIGS. 10 and 11 are views for explaining another embodiment of a grid and a side plate part of the arc extinguishing unit of FIGS. 8 and 9.
Figure 11:
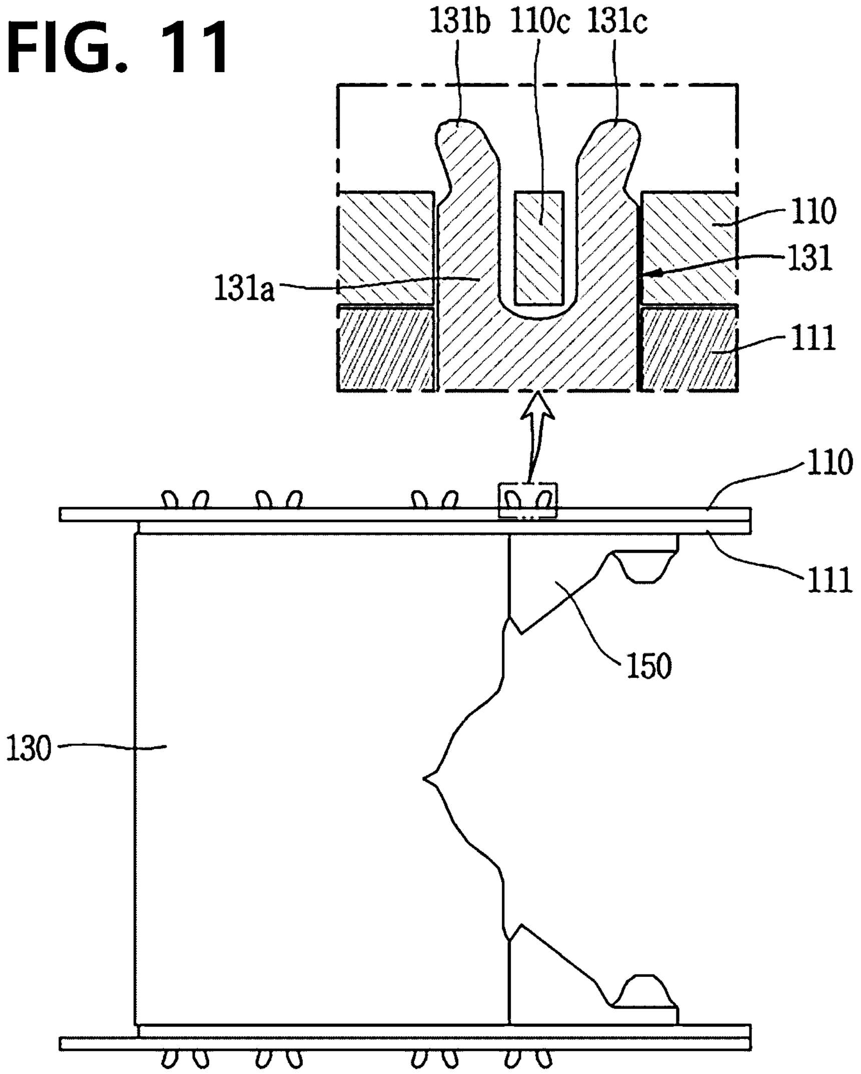
Figure 12:
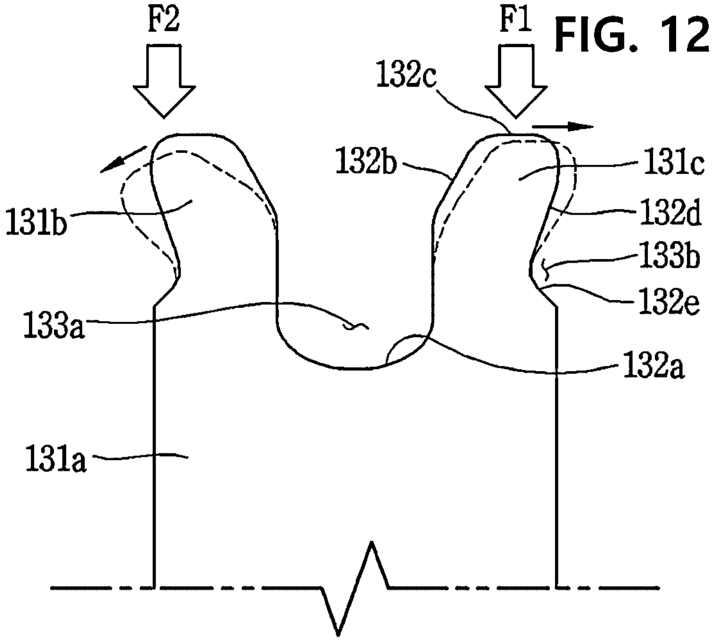
FIG. 12 is a view for explaining the behavior of a protrusion part of the grid of FIG. 9.
Figure 13:
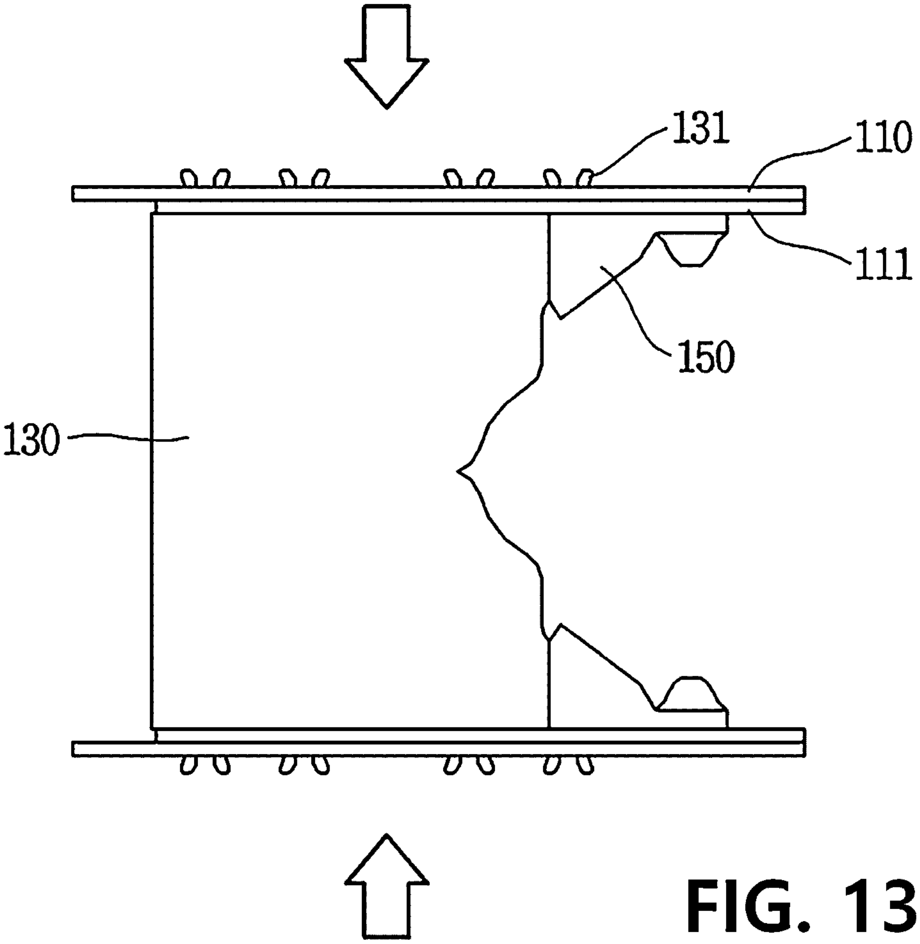
FIG. 13 is a view for explaining that an external force is applied from the side of the arc extinguishing unit of FIG. 9.
Figure 14:
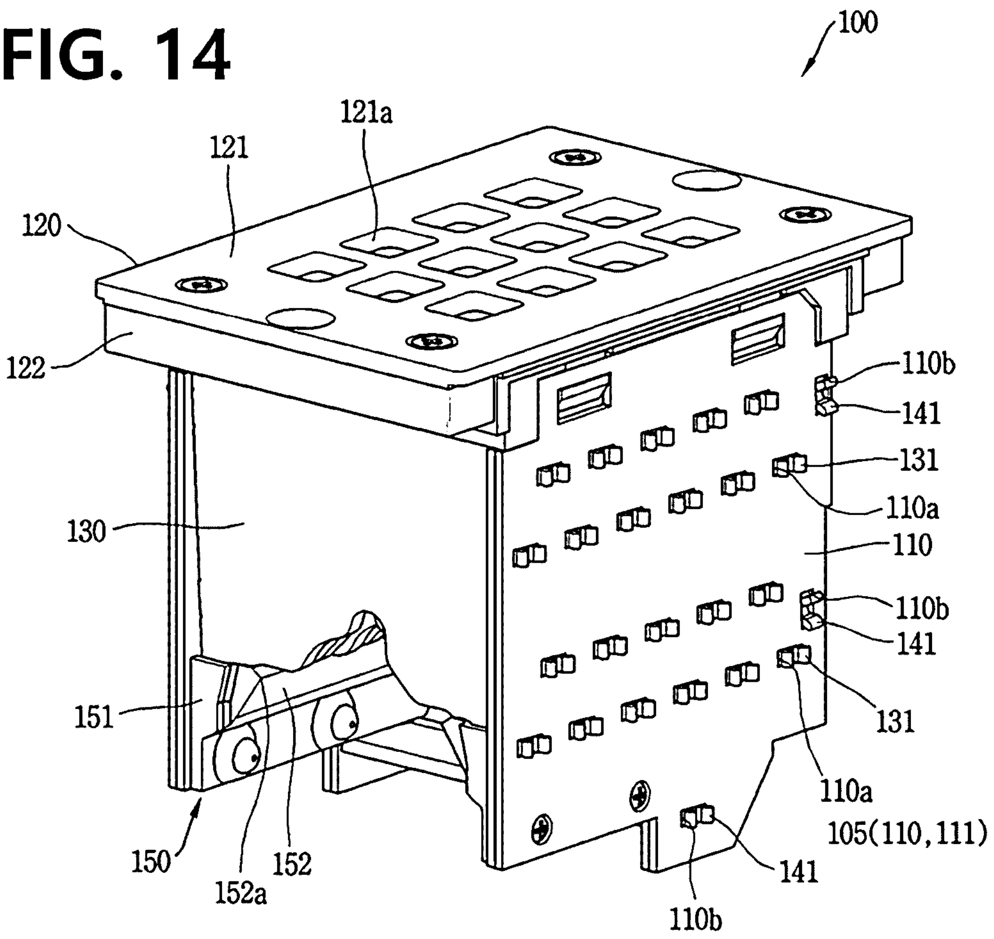
FIG. 14 is a perspective view for explaining an arc extinguishing unit according to another embodiment of the present disclosure.

Specifically, referring to FIGS. 10 and 11, a central member 110*c* extending across the through hole may be formed in the first through hole 110*a* of the outer support plate 110.

Referring to FIG. 11, the body part 131*a* of the protrusion part 131 passes through the gassing material 111. And the first protrusion 131*b* and the second protrusion 131*c* of the protrusion part 131 pass through the first through hole 110*a* of the outer support plate 110, respectively. In this case, the first protrusion 131*b* and the second protrusion 131*c* may be inserted into different regions of the first through hole 110*a* with the central member 110*c* as the center.

The central member 110*c* may serve as a rib of the first through hole 110*a*. Thus, since the central member 110*c* is formed, the first through hole 110*a* can have increased rigidity against the behavior of the protrusion part 131.

In the illustrated embodiment, the side plate part 105 is provided in a plate shape having a plurality of edges formed at vertices. The side plate part 105 may be provided in any shape capable of forming both sides of the arc extinguishing unit 100 and supporting each component of the arc extinguishing unit 100.

The side plate part 105 is coupled to the cover assembly 120. Specifically, the cover assembly 120 is coupled to the upper side of the side plate part 105. The above coupling may be achieved by a fitting coupling between the side plate part 105 and the cover assembly 120 or by a separate fastening member.

The side plate part 105 is coupled to the arc guide 150. Specifically, the arc guide 150 is coupled to the lower side of the side plate part 105, that is, to one side opposite to the cover assembly 120. The above coupling may be achieved by a separate fastening member.

The side plate part 105 is coupled to the arc runner 140. Specifically, the arc runner 140 is coupled to the rear side of the side plate part 105, that is, to one side opposite to the fixed contact 311. The above coupling may be achieved by a separate fastening member.

The grid 130 guides an arc generated when the fixed contact 311 and the movable contact 321 are spaced apart to the arc extinguishing unit 100.

The grid 130 may be formed of a magnetic body. This is to apply an attractive force to the arc, which is a flow of electrons.

A plurality of grids 130 may be provided. The plurality of grids 130 may be spaced apart from each other and stacked. In the illustrated embodiment, eleven grids 130 are provided and stacked in the front-rear direction.

The number of grids 130 may be changed. Specifically, the number of grids 130 may be changed according to the size and performance of the arc extinguishing unit 100, or the rated capacity of the air circuit breaker 10 in which the arc extinguishing unit 100 is provided, or the like.

An introduced arc may be subdivided and flowed through a space formed by the plurality of grids 130 being spaced apart from each other. Accordingly, the pressure of the arc may be increased, and the moving speed and the extinguishing speed of the arc may be increased.

The arc runner 140 is positioned adjacent to the grid 130 furthest from the fixed contact 311 among the plurality of grids 130, i.e., the grid 130 on the rear side in the illustrated embodiment.

An end of the grid 130 in the width direction, i.e., left-right direction in the illustrated embodiment, may be formed to protrude toward the fixed contact 311, that is, toward the lower side. That is, the grid 130 is formed in a peak shape with left and right ends pointing downward.

Accordingly, the generated arc may effectively proceed toward the end of the grid 130 in the left-right direction, and may easily flow to the arc extinguishing unit 100.

The arc guide 150 is located on the outer side of the left-right end of the grid 130, i.e., on the lower side in the illustrated embodiment.

The grid 130 is coupled to the side plate part 105. Specifically, a plurality of protrusion parts 131 are formed at the edges of the grid 130 in the width direction, i.e., the left-right direction in the illustrated embodiment, in the extension direction, i.e., the up-down direction in the illustrated embodiment. The protrusion part 131 of the grid 130 is inserted into and coupled to the through hole formed in the side plate part 105.

One side of the grid 130 facing the cover assembly 120, i.e., the upper end in the illustrated embodiment, may be positioned adjacent to the cover assembly 120. The arc flowing along the grid 130 may pass through the cover assembly 120 and be discharged to the outside.

The cover assembly 120 forms the upper side of the arc extinguishing unit 100. The cover assembly 120 is configured to cover the upper end of the grid 130. The arc passing through the space formed by the plurality of grids 130 spaced apart from each other may be discharged to the outside of the air circuit breaker 10 through the cover assembly 120.

The cover assembly 120 is coupled to the side plate part 105. A protrusion inserted into the through hole of the side plate part 105 may be formed at an edge of the cover assembly 120 in the width direction, i.e., the left-right direction in the illustrated embodiment. In addition, the cover assembly 120 and the side plate part 105 may be coupled by a separate fastening member.

The cover assembly 120 is formed to extend in one direction, i.e., in the front-rear direction in the illustrated embodiment. It will be understood that the above direction is the same as the direction in which the plurality of grids 130 are stacked.

The length of the cover assembly 120 in the other direction, i.e., the width direction in the illustrated embodiment, may be determined according to the length of the plurality of grids 130 in the width direction.

In the illustrated embodiment, the cover assembly 120 includes an upper frame 121, a mesh part 123, a first insulation filter 124, a second insulation filter 126, a spacer 125, a cover body 122, and a packing part 122*b*.

The cover body 122 forms the outer shape of the cover assembly 120. The cover body 122 is coupled to the side plate part 105. In addition, the upper frame 121 is coupled to the cover body 122.

A predetermined space is formed inside the cover body 122. The space may be covered by the upper frame 121. The mesh part 123, the first insulation filter 124, the second insulation filter 126, and the spacer 125 are accommodated in the space. Accordingly, the space may be referred to as an "accommodation space".

The accommodation space communicates with a space formed by spacing the grids 130 apart. As a result, the accommodation space communicates with the inner space of the cover unit 200. Accordingly, the generated arc can flow into the accommodation space of the cover body 122 by passing through the space formed by the separation of the grids 130.

An upper end of the grid 130 may be in contact with one side of the cover body 122 facing the grid 130, i.e., the lower side in the illustrated embodiment. In an embodiment, the cover body 122 may support the upper end of the grid 130.

The cover body 122 may be formed of a heat-resistant material. This is to prevent damage or shape deformation by the generated arc.

In the illustrated embodiment, the length of the cover body 122 in the front-rear direction is longer than the length in the left-right direction. The shape of the cover body 122 may be changed according to the shape of the side plate part 105 and the shape and number of the grids 130.

The upper frame 121 is coupled to one side of the cover body 122 opposite to the grid 130, i.e., the upper side in the illustrated embodiment.

The upper frame 121 is coupled to the upper side of the cover body 122. The upper frame 121 is configured to cover the accommodation space formed in the cover body 122, and the mesh part 123, the first insulation filter 124, the second insulation filter 126, and the spacer 125 accommodated in the accommodation space.

In the illustrated embodiment, the length of the upper frame 121 in the front-rear direction is longer than the length in the left-right direction. The upper frame 121 may be provided in an arbitrary shape capable of stably being coupled to the upper side of the cover body 122 and covering the accommodation space and components accommodated in the accommodation space.

A plurality of through holes 121*a* are formed in the upper frame 121. Through the through hole, an arc passing between the grids 130 and extinguished may be discharged. In the illustrated embodiment, the through-holes 121*a* are provided in four lines in the front-rear direction, three each in the left-right direction, and a total of 12 are formed. The number of through holes may be changed.

The through holes are located to be spaced apart from each other. A kind of rib is formed between the through holes. The rib may press the mesh part 123, the first insulation filter 124, the second insulation filter 126, and the spacer 125 accommodated in the space of the cover body 122 from the upper side.

Accordingly, even if an arc is generated, the mesh part 123, the first insulation filter 124, the second insulation filter 126, and the spacer 125 are not arbitrarily separated from the accommodation space of the cover body 122.

The upper frame 121 may be fixedly coupled to an upper side of the cover body 122. In the illustrated embodiment, the upper frame 121 is fixedly coupled to the upper side of the cover body 122 by a fastening member.

The mesh part 123, the first insulation filter 124, second insulation filter 126, and the spacer 125 are positioned in the accommodation space of the cover body 122 between the upper frame 121 and the cover body 122, that is, in the lower side of the upper frame 121.

In other words, the mesh part 123, the first insulation filter 124, the spacer 125, and the second insulation filter 126 are stacked from top to bottom in the accommodation space of the cover body 122.

The mesh part 123 passes through a space formed between the grids 130 and serves to filter out impurities remaining in the extinguished arc. The extinguished arc may pass through the mesh part 123 and be discharged to the outside after remaining impurities are removed.

That is, the mesh part 123 functions as a kind of filter.

The mesh part 123 may include a plurality of layers. In this case, each layer may be made of wires having different diameters. Thus, the mesh part 123 includes a plurality of through holes. It is preferable that the size, that is, the diameter of the through hole is smaller than the diameter of the impurity particles remaining in the arc. In addition, it is preferable that the diameter of the through hole is sufficiently large so that the gas included in the arc can pass through.

A plurality of mesh parts 123 may be provided. The plurality of mesh parts 123 may be stacked in the up and down direction. Accordingly, impurities remaining in the arc passing through the mesh part 123 can be effectively removed.

The mesh part 123 is accommodated in the accommodation space formed inside the cover body 122. The shape of the mesh part 123 may be determined according to the shape of the accommodation space.

The mesh part 123 is located below the upper frame 121. The plurality of through holes formed in the mesh part 123 communicate with the plurality of through holes formed in the upper frame 121. Accordingly, the arc passing through the mesh part 123 may pass through the upper frame 121 and be discharged to the outside.

The plurality of through holes formed in the mesh part 123 communicate with a space in which the grids 130 are spaced apart. As a result, the plurality of through holes formed in the mesh part 123 communicate with the inner space of the cover unit 200.

The first insulation filter 124, the second insulation filter 126, and the spacer 125 are positioned below the mesh part 123.

The first insulation filter 124 may be disposed below the mesh part 123, and an exhaust hole 124*a* may be formed in a partial area thereof.

Specifically, a plurality of exhaust holes 124*a*, aligned in the width direction and the longitudinal direction, are formed in the first insulation filter 124. In this case, the first insulation filter 124 may be divided into three regions along the longitudinal direction. Specifically, the first insulation filter 124 may be divided into a first region Z-A, a second region Z-B, and a third region Z-C along the longitudinal direction.

In the illustrated embodiment, the exhaust hole 124*a* may be formed in the entire area in the width direction of the first region Z-A. In addition, the exhaust hole 124*a* may be formed in a partial area in the width direction of the second region Z-B. The exhaust hole 124*a* is not formed in the third region Z-C.

In this case, the plurality of exhaust holes 124*a* formed in the second region Z-B are formed at the center in the width direction in an area adjacent to the third region Z-C. And the plurality of exhaust holes 124*a* formed in the second region Z-B are formed throughout the width direction in an area adjacent to the first region Z-A. And the number of exhaust holes 124*a* formed from the third region Z-C to the first region Z-A may increase.

In other words, the plurality of exhaust holes 124*a* formed in the second region Z-B are formed wide in the width direction near the first region Z-A, and are formed only in the central portion near the third region Z-C. That is, the exhaust hole 124*a* formed in the second region Z-B may have an inverted triangle shape in which a portion close to the first region Z-A forms a long side.

The second insulation filter 126 may be disposed below the first insulation filter 124, and an exhaust hole 126*a* may be formed in an area different from the exhaust hole 124*a* of the first insulation filter 124.

The spacer 125 may be interposed between the first insulation filter 124 and the second insulation filter 126. The spacer 125 may maintain a distance between the first insulation filter 124 and the second insulation filter 126.

The first insulation filter 124 and the second insulation filter 126 are arranged up and down around the spacer 125. In the first insulation filter 124, the exhaust holes 124*a* are formed differently in the first region Z-A and the second region Z-B, and the exhaust hole 124*a* is not formed in the third region Z-C.

And the exhaust hole 126*a* formed in the second insulation filter 126 and the exhaust hole 124*a* formed in the first insulation filter 124 may be formed at different positions.

The arc generated inside the arc extinguishing unit 100 may be discharged toward the upper frame 121 through the second insulation filter 126, the spacer 125, and the first insulation filter 124.

However, the positions of the exhaust holes formed in the first insulation filter 124 and the second insulation filter 126 are different, and the exhaust holes 124*a* are formed differently according to regions in the first insulation filter 124.

Since the positions and arrangements of the exhaust holes formed in the above-described first insulation filter 124 and second insulation filter 126 are different from each other, the arc generated in the region corresponding to the first region Z-A of the first insulation filter 124 inside the arc extinguishing unit 100 can be discharged relatively easily along the exhaust hole 126*a* formed in the second insulation filter 126 and the exhaust hole 124*a* formed in the first insulation filter 124.

In addition, arcs generated in an area corresponding to the second region Z-B of the first insulation filter 124 inside the arc extinguishing unit 100 may have reduced discharge compared to arcs generated in an area corresponding to the first region Z-A.

In addition, arcs generated in an area corresponding to the third region Z-C of the first insulation filter 124 inside the arc extinguishing unit 100 may have further reduced discharge compared to arcs generated in areas corresponding to the first region Z-A and the second region Z-B.

In this case, the second insulation filter 126 may function to adjust the initial pressure inside the arc extinguishing unit 100 by forming exhaust holes 126*a* at regular intervals on the front surface of the filter. In addition, the first insulation filter 124 may function to adjust the pressure inside the arc extinguishing unit 100 by configuring the arrangement and formation location of the exhaust hole 124*a* differently according to the region. Specifically, it may lower the pressure in the area corresponding to the first region Z-A and increase the pressure in the corresponding area toward the second region Z-B and the third region Z-C.

By forming different pressures in each region inside the arc extinguishing unit 100, the arc generated inside the arc extinguishing unit 100 can be easily applied to the grid 130. That is, since the pressure increases toward the rear surface of the arc extinguishing unit 100, the generated arc may receive a force to rise upward. As a result, the probability that the arc is applied to the adjacent grid 130 increases.

The cover body 122 may fix the positions of the mesh part 123, the first insulation filter 124, the spacer 125, and the second insulation filter 126 by accommodating them in an internal space.

The cover body 122 may include a base 122*a* and a packing part 122*b* coupled to the base 122*a*.

The packing part 122*b* is coupled to the cover body 122. The packing part 122*b* blocks a space between the outside and the cover assembly 120. Accordingly, the packing part 122*b* is made to maintain the pressure inside the arc extinguishing unit 100.

A coupling protrusion 122*c* may protrude from a sidewall of the inner space of the cover body 122. Specifically, in the illustrated embodiment, a coupling protrusion 122*c* protrudes from the upper sidewall of the inner space of the cover body 122.

In addition, concave fitting grooves 124*b*, 125*b*, and 126*b* may be formed on sidewalls of the first insulation filter 124, the spacer 125, and the second insulation filter 126 so that the above-described coupling protrusion 122*c* can be inserted.

The arc guide 150 guides a generated arc so that the arc flows toward the grid 130. It is possible to prevent damage to the side plate part 105 by flowing the generated arc toward the side plate part 105 by the arc guide 150.

The arc guide 150 is located on one side of the side plate part 105 facing the fixed contact 311 and the movable contact 321. In the illustrated embodiment, the arc guide 150 is located on the lower side of the side plate part 105.

A plurality of arc guides 150 may be provided. The plurality of arc guides 150 may be coupled to each side plate part 105. In the illustrated embodiment, two arc guides 150 are provided and coupled to each side plate part 105, respectively. The two arc guides 150 are arranged to face each other.

The arc guide 150 is coupled to the side plate part 105. The above coupling may be achieved by a separate fastening member.

The arc guide 150 may be formed of a heat-resistant material. This is to prevent damage and shape deformation due to the generated arc. In an embodiment, the arc guide 150 may be formed of a ceramic material.

The arc guide 150 is disposed to partially encase a peak portion formed on opposite sides of the grid 130, i.e., on the end in the left-right direction in the illustrated embodiment. Accordingly, arcs guided by the arc guide 150 may not be concentrated on any one part of the grid 130.

The arc guide 150 may extend in the extension direction of the side plate part 105, i.e., in the front-rear direction in the illustrated embodiment. That is, the arc guide 150 may extend between the grid 130 located at the frontmost side and the grid 130 located at the rearmost side.

The arc guide 150 includes a vertical portion 151 and a protruding portion 152.

The vertical portion 151 is a portion where the arc guide 150 is coupled to the side plate part 105. The vertical portion 151 is located on one side of the side plate part 105 facing the fixed contact terminal 310, i.e., on the lower side in the illustrated embodiment. The vertical portion 151 may be coupled to the side plate part 105 by a fastening member.

The vertical portion 151 extends in a direction toward the grid 130, i.e., upward in the illustrated embodiment. In an embodiment, the vertical portion 151 may extend while being in contact with the side plate part 105. In another embodiment, the vertical portion 151 may extend parallel to the side plate part 105.

The protruding portion 152 extends from an end portion of the vertical portion 151.

The protruding portion 152 is formed to partially encase a peak portion formed at an end portion of the grid 130 in the left-right direction. One surface of the protruding portion 152 is formed to form a predetermined angle with the vertical portion 151. In an embodiment, one surface of the protruding portion 152 may extend, forming an obtuse angle with the vertical portion 151.

In another embodiment, the protruding portion 152 may extend parallel to a peak portion formed at an end portion of the grid 130 in the left-right direction.

A bent portion 152*a* may be formed at an end portion of the protruding portion 152. The bent portion 152*a* may be formed between one surface of the protruding portion 152 extending while forming a predetermined angle with the vertical portion 151 and another surface extending toward the vertical portion 151 again. This bent portion 152*a* forms a peak, so that an arc can be more easily guided.

The arc runner 140 guides a generated arc so that the arc flows toward the grid 130. By the arc guide 150, it is possible to prevent the generated arc from advancing to one wall of the cover unit 200 beyond the grid 130. Accordingly, it is possible to prevent the cover unit 200 from being damaged by the generated arc.

The arc runner 140 is located on one side of the side plate part 105 facing the fixed contact 311 and the movable contact 321. In the illustrated embodiment, the arc runner 140 is located on the lower side of the side plate part 105.

The arc runner 140 is located on the other side of the side plate part 105 opposite to the fixed contact 311. Specifically, the arc runner 140 is located on the rear side in the lower side of the side plate part 105 so as to be opposite to the fixed contact 311 located on the front side of the side plate part 105.

The arc runner 140 is coupled to the side plate part 105. The coupling may be formed by inserting a protrusion formed at an end of the arc runner 140 in the left-right direction into a through hole formed in the side plate part 105.

The arc runner 140 may be formed of a conductive material. This is to guide the arc effectively by applying an attractive force to the flowing arc. In an embodiment, the arc runner 140 may be formed of copper, iron, or an alloy including the same.

The arc runner 140 extends toward the grid 130 by a predetermined length. In an embodiment, the arc runner 140 may be disposed to cover the grid 130 located farthest from the fixed contact 311, i.e., the grid 130 located at the rearmost side in the illustrated embodiment, from the rear side.

Accordingly, since the arc does not extend beyond the grid 130 located at the rearmost side, damage to the cover unit 200 can be prevented. Also, the generated arc can be effectively guided toward the grid 130.

The arc runner 140 may have an arc runner protrusion part 141 on its side surface. The arc runner protrusion part 141 may be coupled to the side plate part 105 through the through holes 110*b* and 111*b* formed in the side plate part 105. Meanwhile, an arc runner opening 142 may be formed at a central portion of the arc runner 140.

A low runner 145 is disposed on the fixed contact terminal 310. The low runner 145 is disposed obliquely toward the arc extinguishing unit 100 above the fixed contact 311. The low runner 145 may guide an arc so that the arc generated when the fixed contact 311 and the movable contact 321 are in contact with each other and spaced apart may be guided toward the grid 130.

The low runner 145 may be formed of a conductive material. This is to guide the arc effectively by applying an attractive force to the flowing arc. In an embodiment, the low runner 145 may be formed of copper, iron, or an alloy including the same.

The low runner 145 extends toward the grid 130 by a predetermined length. In an embodiment, the low runner 145 may extend adjacent to the grid 130 located closest to the fixed contact 311.

Accordingly, since the arc does not extend beyond the grid 130 located at the frontmost side, damage to the cover unit 200 can be prevented. Also, the generated arc can be effectively guided toward the grid 130.

As described, although the above has been described with reference to preferred embodiments of the present disclosure, it will be understood that those skilled in the art can variously modify and change the present disclosure without departing from the idea and scope of the present disclosure described in the claims below.

What is claimed is:

1. An arc extinguishing unit, comprising:

a plurality of side plate parts spaced apart from each other and disposed to face each other;

a plurality of grids located between the plurality of side plate parts, spaced apart from each other, and coupled to the plurality of side plate parts, respectively; and a cover assembly disposed above the plurality of grids and configured to cover the plurality of grids, wherein each side plate part of the plurality of side plate parts comprises:

a gassing material that generates molecules that extinguish an arc when heat generated by the arc is applied, an outer support plate, disposed outside the gassing material, coupled to the plurality of grids, and pressurizing and fixing the gassing material toward the plurality of grids, wherein each grid of the plurality of grids comprises a plurality of protrusion parts protruding from both side surfaces and coupled to the plurality of side plate parts, wherein each protrusion part of the plurality of protrusion parts penetrates the gassing material and the outer support plate of each side plate part of the plurality of side plate parts and is coupled to the gassing material and the outer support plate of each side plate part of the plurality of side plate parts, and wherein the cover assembly comprises:

an upper frame disposed at a top and through which a lattice exhaust outlet is formed in a central portion;

a mesh part disposed below the upper frame and composed of a plurality of layers, each layer having different wire diameters;

a first insulation filter disposed below the mesh part and having a first exhaust hole formed in a partial area thereof, wherein a plurality of exhaust holes, aligned in a width direction and a longitudinal direction, are formed in the first insulation filter, and wherein the first insulation filter is composed of:

a first region in which exhaust holes of the plurality of exhaust holes are formed in an entire area along the width direction;

a second region in which exhaust holes of the plurality of exhaust holes are formed in a partial area in the width direction; and a third region in which exhaust holes of the plurality of exhaust holes are not formed;

a second insulation filter disposed below the first insulation filter and having a second exhaust hole formed in an area different from the first exhaust hole of the first insulation filter; and a spacer interposed between the first insulation filter and the second insulation filter to maintain a distance between the first insulation filter and the second insulation filter.

2. The arc extinguishing unit of claim 1, wherein the outer support plate comprises a fiber-reinforced polyester composite.

3. The arc extinguishing unit of claim 1, wherein each protrusion part of the plurality of protrusion parts comprises:

a body part extending from a side surface of a respective grid; and a first protrusion and a second protrusion extending from the body part to both sides.

4. The arc extinguishing unit of claim 3, wherein the first protrusion and the second protrusion are spaced apart from each other and extend outwardly from the body part, and extend in a direction away from each other so as to be symmetrical about a central portion of the body part.

5. The arc extinguishing unit of claim 4, wherein a U-groove capable of absorbing left and right deformation of the first protrusion and the second protrusion by a first external force is formed in a space between the first protrusion and the second protrusion, and wherein a concave groove capable of absorbing back and forth deformation of the first protrusion and the second protrusion by a second external force is formed between the first protrusion and the second protrusion and the body part.

6. The arc extinguishing unit of claim 4, wherein a through hole into which a protrusion part of the plurality of protrusion parts is inserted is formed in the outer support plate, and wherein the outer support plate comprises a central member formed in the through hole and extending across the through hole so that the first protrusion and the second protrusion are inserted separately from each other.

7. The arc extinguishing unit of claim 1, wherein the cover assembly further comprises:

a cover body accommodating and fixing the mesh part, the first insulation filter, the spacer, and the second insulation filter; and a packing part coupled to the cover body, blocking a space between an outside and the cover assembly, and maintaining internal pressure, and wherein the cover assembly has coupling protrusions protruding from sidewalls of an inner space and formed to be fitted to sidewalls of the first insulation filter, the spacer, and the second insulation filter.

8. The arc extinguishing unit of claim 1, wherein the plurality of exhaust holes formed in the second region are:

formed at a center in the width direction in an area adjacent to the third region, formed throughout the width direction in an area adjacent to the first region, and formed such that a number of exhaust holes formed gradually increases from the third region to the first region.

9. An air circuit breaker, comprising:

a fixed contact;

a movable contact configured to be movable in a direction toward or away from the fixed contact; and an arc extinguishing unit disposed adjacent to the fixed contact and the movable contact, and configured to extinguish an arc generated when the fixed contact and the movable contact are spaced apart, wherein the arc extinguishing unit comprises:

a plurality of side plate parts spaced apart from each other and disposed to face each other;

a plurality of grids located between the plurality of side plate parts, spaced apart from each other, and coupled to the plurality of side plate parts, respectively; and a cover assembly disposed above the plurality of grids and configured to cover the plurality of grids, and wherein each side plate part of the plurality of side plate parts comprises:

a gassing material that generates molecules that extinguish the arc when heat generated by the arc is applied; and an outer support plate disposed outside the gassing material, coupled to the plurality of grids, and pressurizing an fixing the gassing material toward the plurality of grids, wherein each grid of the plurality of grids comprises a plurality of protrusion parts protruding from both side surfaces and coupled to the plurality of side plate parts, each protrusion part of the plurality of protrusion parts comprising:

a body part extending from a side surface of a respective grid; and a first protrusion and a second protrusion extending from the body part to both sides, wherein a U-groove capable of absorbing left and right deformation of the first protrusion and the second protrusion by a first external force is formed in a space between the first protrusion and the second protrusion, and wherein a concave groove capable of absorbing back and forth deformation of the first protrusion and the second protrusion by a second external force is formed between the first protrusion and the second protrusion and the body part.

10. The air circuit breaker of claim 9, further comprising an arc runner disposed on a fixed contact terminal to which the fixed contact is connected and extending from the fixed contact terminal toward the plurality of grids.

11. An arc extinguishing unit, comprising:

a plurality of side plate parts spaced apart from each other and disposed to face each other;

a plurality of grids located between the plurality of side plate parts, spaced apart from each other, and coupled to the plurality of side plate parts, respectively; and a cover assembly disposed above the plurality of grids and configured to cover the plurality of grids, wherein each side plate part of the plurality of side plate parts comprises:

a gassing material that generates molecules that extinguish an arc when heat generated by the arc is applied, an outer support plate, disposed outside the gassing material, coupled to the plurality of grids, and pressurizing and fixing the gassing material toward the plurality of grids, wherein each grid of the plurality of grids comprises a plurality of protrusion parts protruding from both side surfaces and coupled to the side plate parts, each protrusion part of the plurality of protrusion parts comprising:

a body part extending from a side surface of a respective grid; and a first protrusion and a second protrusion extending from the body part to both sides, wherein a U-groove capable of absorbing left and right deformation of the first protrusion and the second protrusion by a first external force is formed in a space between the first protrusion and the second protrusion, and wherein a concave groove capable of absorbing back and forth deformation of the first protrusion and the second protrusion by a second external force is formed between the first protrusion and the second protrusion and the body part.

* * * * *